United States Patent
Mitani et al.

(10) Patent No.: US 11,057,874 B2
(45) Date of Patent: Jul. 6, 2021

(54) COMMUNICATION CONTROL DEVICE, COMMUNICATION CONTROL METHOD AND RECORDING MEDIUM

(71) Applicant: NEC Corporation, Tokyo (JP)

(72) Inventors: Shohei Mitani, Tokyo (JP); Nobuhito Taniuchi, Tokyo (JP); Masaaki Maruyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/085,640

(22) PCT Filed: Mar. 15, 2017

(86) PCT No.: PCT/JP2017/010422
§ 371 (c)(1),
(2) Date: Sep. 17, 2018

(87) PCT Pub. No.: WO2017/164040
PCT Pub. Date: Sep. 28, 2017

(65) Prior Publication Data
US 2019/0098609 A1    Mar. 28, 2019

(30) Foreign Application Priority Data
Mar. 25, 2016    (JP) .............................. JP2016-061836

(51) Int. Cl.
*H04W 72/04*    (2009.01)
*H04L 5/00*    (2006.01)
*H04W 72/12*    (2009.01)

(52) U.S. Cl.
CPC ......... *H04W 72/042* (2013.01); *H04L 5/0053* (2013.01); *H04L 5/0064* (2013.01);
(Continued)

(58) Field of Classification Search
CPC ......... H04W 72/0486; H04W 72/0493; H04W 72/1226; H04W 72/1252; H04W 72/1257; H04W 72/1268
See application file for complete search history.

(56) References Cited

U.S. PATENT DOCUMENTS 6,404,777 B1    6/2002  Hattori et al.
9,554,416 B2 *  1/2017  Mueck .................. H04W 76/36
(Continued)

FOREIGN PATENT DOCUMENTS

JP    H11-275151 A    10/1999
JP    2001-223716 A    8/2001
(Continued)

OTHER PUBLICATIONS

Author Unknown, Support to Live-Change of Downlink-Uplink Allocation Ratio in LTE/TDD, 3GPP TSG RAN WG1 Meeting #52bis, Doc. No. R1-081415, Apr. 4, 2008 (Year: 2008).*
(Continued)

*Primary Examiner* — Christopher M Crutchfield

(57) ABSTRACT

A communication control device comprises: a transmission unit which transmits, to each of a plurality of communication devices that perform communication using previously allocated communication resources, allocation information indicating the allocation of the communication resources to be used when the communication devices perform communication; and an intermediate state generation unit which, when the allocation of the communication resources to the respective communication devices is changed from a first allocation state to a second allocation state, generates an intermediate state indicating the allocation of the communication resources, on the basis of the first allocation state and the second allocation state, wherein the transmission unit transmits the allocation information to each of the communication devices such that the allocation changes
(Continued)

from the first allocation state to the second allocation state via the intermediate state generated by the intermediate state generation unit.

4 Claims, 30 Drawing Sheets

(52) U.S. Cl.
CPC ....... *H04L 5/0096* (2013.01); *H04W 72/0486* (2013.01); *H04W 72/0493* (2013.01); *H04W 72/1226* (2013.01); *H04W 72/1252* (2013.01)

(56) References Cited

U.S. PATENT DOCUMENTS

| | | | |
|---|---|---|---|
| 2005/0220117 A1 | 10/2005 | Omi et al. | |
| 2009/0042572 A1* | 2/2009 | Craig | H04W 36/28 455/436 |
| 2009/0201838 A1* | 8/2009 | Zhang | H04B 7/2656 370/280 |
| 2012/0120854 A1* | 5/2012 | Zhang | H04B 7/2656 370/280 |
| 2012/0257497 A1 | 10/2012 | Yoshimoto et al. | |
| 2013/0303177 A1* | 11/2013 | Chen | H04W 72/00 455/450 |

FOREIGN PATENT DOCUMENTS

| | | |
|---|---|---|
| JP | 2008-211475 A | 9/2008 |
| JP | 2013-090224 A | 5/2013 |
| JP | 2014-160920 A | 9/2014 |
| WO | 2011/077658 A1 | 6/2011 |

OTHER PUBLICATIONS

International Search Report for PCT Application No. PCT/JP2017/010422, dated Jun. 6, 2017.

English translation of Written opinion for PCT Application No. PCT/JP2017/010422.

* cited by examiner

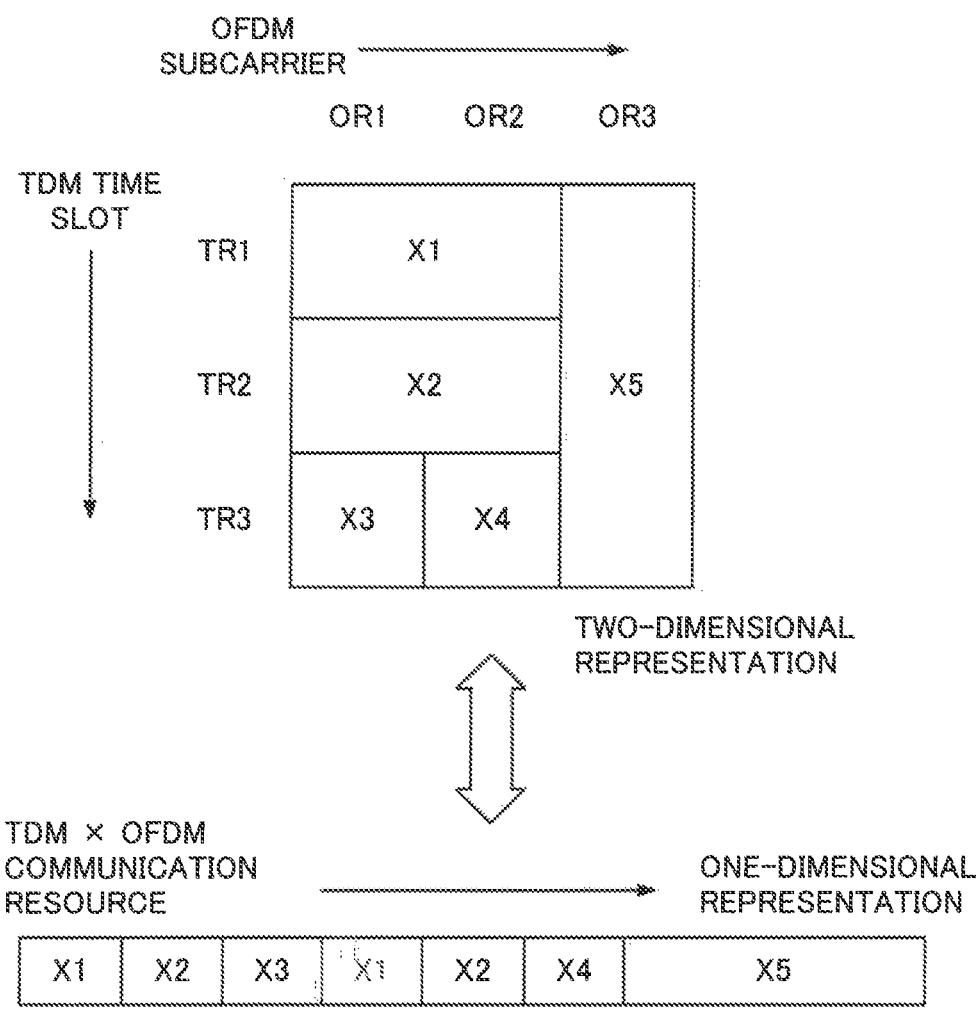

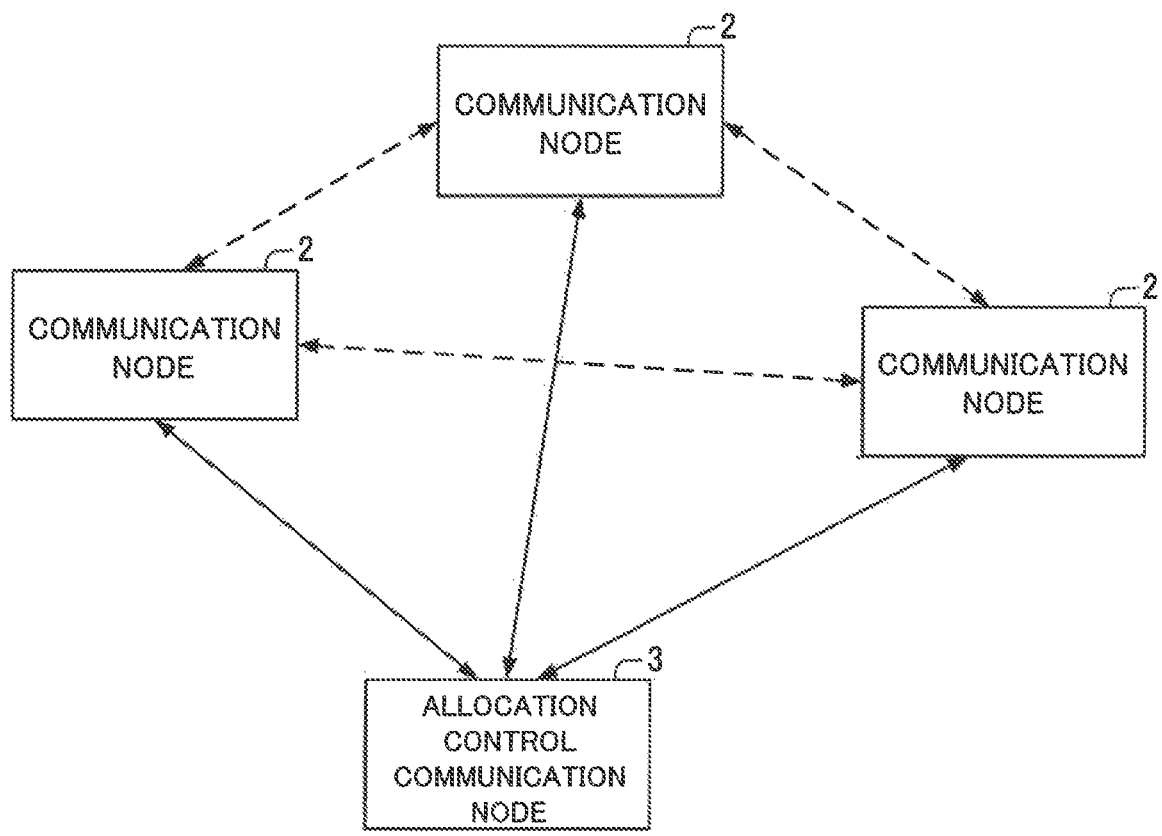

COMMUNICATION CONTROL DEVICE, COMMUNICATION CONTROL METHOD AND RECORDING MEDIUM

This application is a National Stage Entry of PCT/JP2017/010422 filed on Mar. 15, 2017, which claims priority from Japanese Patent Application 2016-061836 filed on Mar. 25, 2016, the contents of all of which are incorporated herein by reference, in their entirety.

TECHNICAL FIELD

The present invention relates to a communication control device, a communication control method, and a recording medium, and particularly relates to a communication control device, a communication control method, and a recording medium that change communication resource allocation.

Background Art

There are various known technologies in which a communication resource (transmission bandwidth) is allocated to a communication device performing communication, and each communication device performs communication by use of the previously allocated communication resource.

For example, PTL 1 describes a communication device including an indicator value calculation means, a congestion degree measurement means, a threshold value setting means, and a determination means. According to PTL 1, the indicator value calculation means calculates an indicator value for each of other communication devices, based on a communication channel quality between the local device and the other communication devices. Further, the threshold value setting means calculates a threshold value, based on a measurement result by the congestion degree measurement means. Then, the determination means compares the indicator value with the threshold value and determines whether or not to set a wireless resource as an allocation candidate for another communication device. With such a configuration, PTL 1 is able to sufficiently exert a power-saving effect while suppressing occurrence of congestion.

Further, for example, PTL 2 describes setting an upper limit of wireless resource allocation for each of a plurality of terminals, based on regulatory information, and existence or nonexistence of an alert, and allocating a wireless resource to each terminal, based on the set upper limit. With such a configuration, PTL 2 is able to efficiently allocate a wireless resource.

Further, for example, PTL 3 describes a wireless communication system including a master station including a scheduler, and a plurality of slave stations. According to PTL 3, the scheduler performs periodic scheduling and optimizes a transmission bandwidth dynamically allocated depending on an execution state of data transmission, and the like. Then, the master station notifies the respective slave stations of transmission bandwidth allocation determined by the scheduler. Subsequently, the slave station performs data transmission in accordance with the determination by the scheduler. With such a configuration, PTL 3 is able to dynamically change allocation of a transmission bandwidth depending on a state of data transmission.

CITATION LIST

Patent Literature

PTL 1: International Application Publication No. WO 2011/077658

PTL 2: Japanese Unexamined Patent Application Publication No. 2013-90224

PTL 3: Japanese Unexamined Patent Application Publication No. 2001-223716

SUMMARY OF INVENTION

Technical Problem

As is the case with the technologies described in PTLs 1 and 2, when communication is performed, a communication resource is allocated to each communication terminal. In this case, a simple communication system often fixes allocation of a resource allocated to each communication terminal, in order to avoid collision in communication. Consequently, there is a problem that it becomes difficult to control an amount of information that can be transmitted and received per unit time by each communication terminal and flexibly select a communication resource, based on an environment.

In order to clear such a problem, it is desirable to dynamically change a communication resource allocated to each communication terminal, as described in PTL 3. However, in a case that communication resource allocation is dynamically changed, for example, when a communication terminal being an allocation destination of the communication resource is changed and any communication terminal fails to receive information to the effect that the communication resource allocation is changed, congestion occurs between the communication terminal and a communication terminal normally receiving the information. Further, as a result of the occurrence of congestion, a communication rate may sharply decrease. Thus, there is a problem that, while it is desirable to dynamically change communication resource allocation allocated to each communication terminal, when communication resource allocation is dynamically changed, congestion may occur upon changing the communication resource allocation, and a communication rate may sharply decrease.

Accordingly, the present invention provides a communication control device solving the problem that, when communication resource allocation allocated to each communication terminal is dynamically changed, congestion may occur upon changing the communication resource allocation, and a communication rate may sharply decrease.

Solution to Problem

To achieve above object, the communication control device according to an aspect of the present invention includes: a transmission unit transmitting, to each of a plurality of communication devices performing communication by use of a previously allocated communication resource, an allocation information indicating allocation of a communication resource used by each of the plurality of communication devices when performing communication; and an intermediate state generation unit generating, when changing allocation of the communication resource to each of the plurality of communication devices from a first allocation state to a second allocation state, an intermediate state indicating allocation of the communication resource, based on the first allocation state and the second allocation state, wherein the transmission unit transmits the allocation information to each of the plurality of communication devices in such a way that the first allocation state changes to the second allocation state via the intermediate state generated by the intermediate state generation unit.

The communication control method according to another aspect of the present invention includes: transmitting, to each of a plurality of communication devices performing communication by use of a previously allocated communication resource, an allocation information indicating allocation of the previously allocated communication resource used by each of the plurality of communication devices when performing communication; when changing allocation of the communication resource to each of the plurality of communication devices from a first allocation state to a second allocation state, generating an intermediate state indicating allocation of the communication resource, based on the first allocation state and the second allocation state; and transmitting the allocation information to each of the plurality of communication devices in such a way that the first allocation state changes to the second allocation state via the intermediate state.

The recording medium according to another aspect of the present invention, is a recording medium recording a program causing a communication control device to provide: a transmission unit transmitting, to each of a plurality of communication devices performing communication by use of a previously allocated communication resource, an allocation information indicating an allocation of the previously allocated communication resource used by each of the plurality of communication devices when performing communication; and an intermediate state generation unit generating, when changing allocation of the communication resource to each of the plurality of communication devices from a first allocation state to a second allocation state, an intermediate state indicating allocation of the communication resource, based on the first allocation state and the second allocation state, wherein the transmission unit transmits the allocation information to each of the plurality of communication devices in such a way that the first allocation state changes to the second allocation state via the intermediate state generated by the intermediate state generation unit.

Advantageous Effect of Invention

By being configured as described above, the present invention is able to provide a communication control device solving a problem that, when communication resource allocation allocated to each communication terminal is dynamically changed, congestion may occur upon changing the communication resource allocation, and a communication rate may sharply decrease.

BRIEF DESCRIPTION OF DRAWINGS

FIG. 1 is a diagram illustrating an example of a communication resource.

FIG. 2 is a diagram illustrating another example of a communication resource.

FIG. 3 is a diagram illustrating a configuration example of a communication system according to a first example embodiment of the present invention.

EXAMPLE EMBODIMENT

First Example Embodiment

Figure 4:
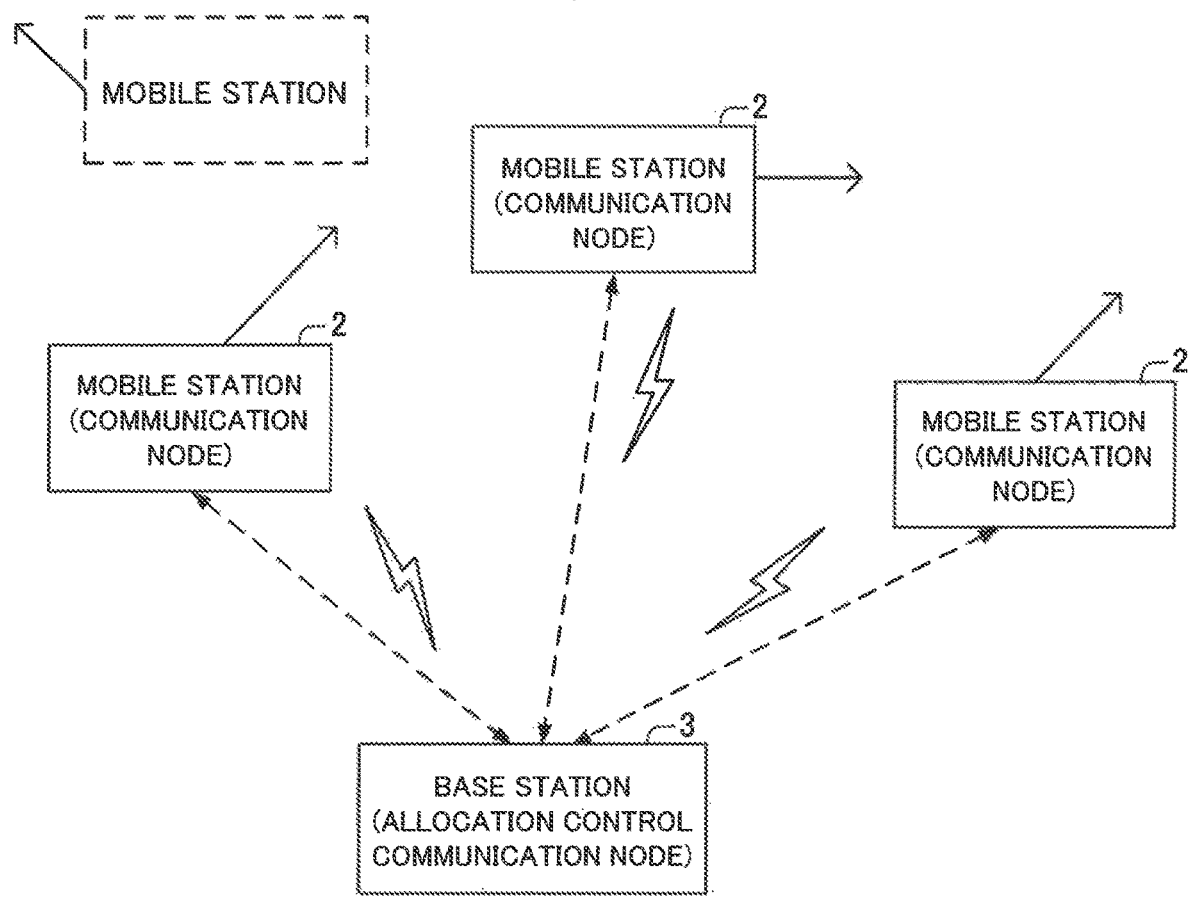
FIG. 4 is a diagram illustrating a configuration example of the communication system according to the first example embodiment of the present invention.

A first example embodiment of the present invention will be described with reference to FIGS. 1 to 32. FIGS. 1 and 2 are diagrams illustrating examples of communication resources. FIGS. 3 and 4 are diagrams illustrating configuration examples of a communication system 1.

Figure 5:
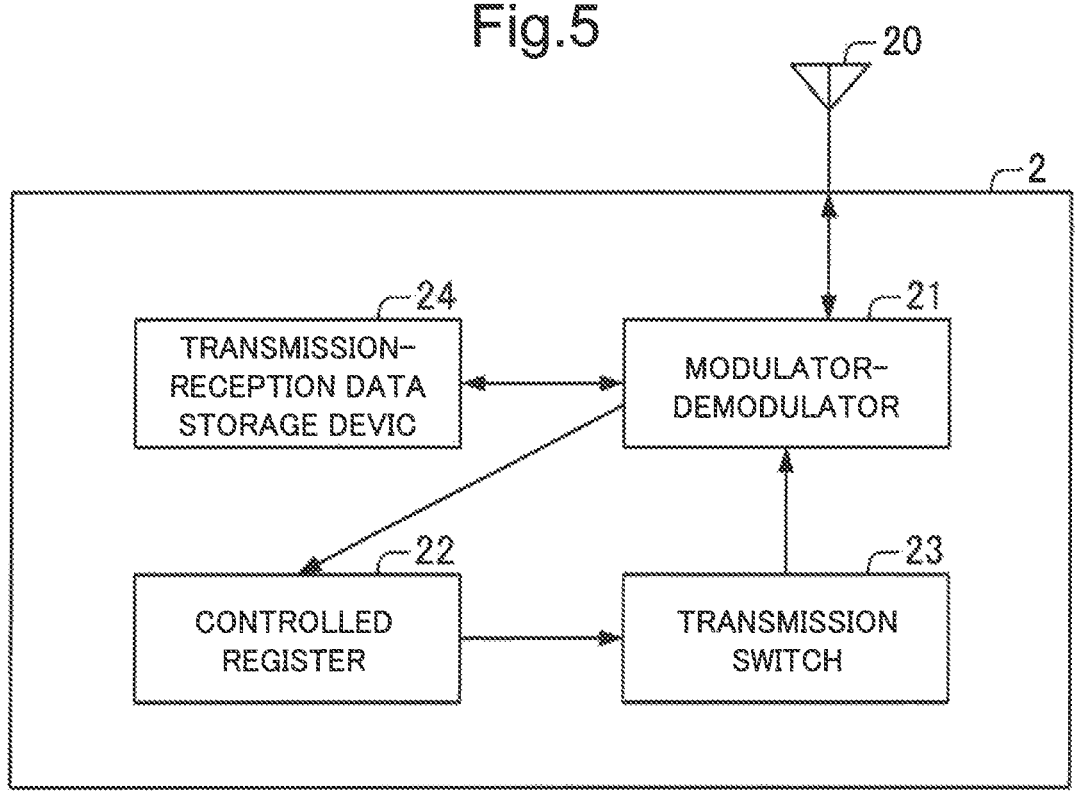
FIG. 5 is a diagram illustrating a configuration example of a communication node illustrated in FIG. 3.
Figure 6:
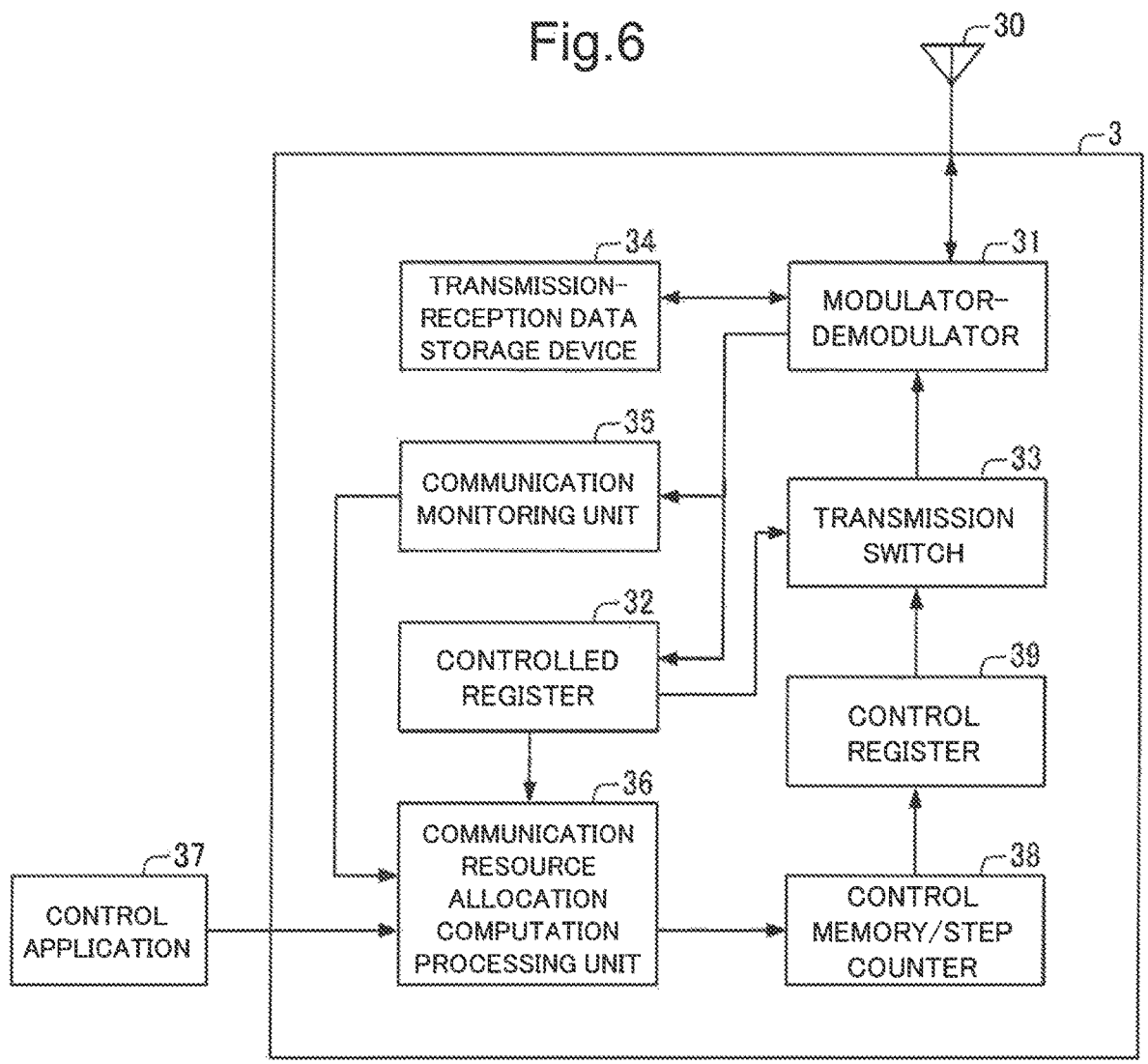
FIG. 6 is a diagram illustrating a configuration example of an allocation control communication node illustrated in FIG. 3.
Figure 7:
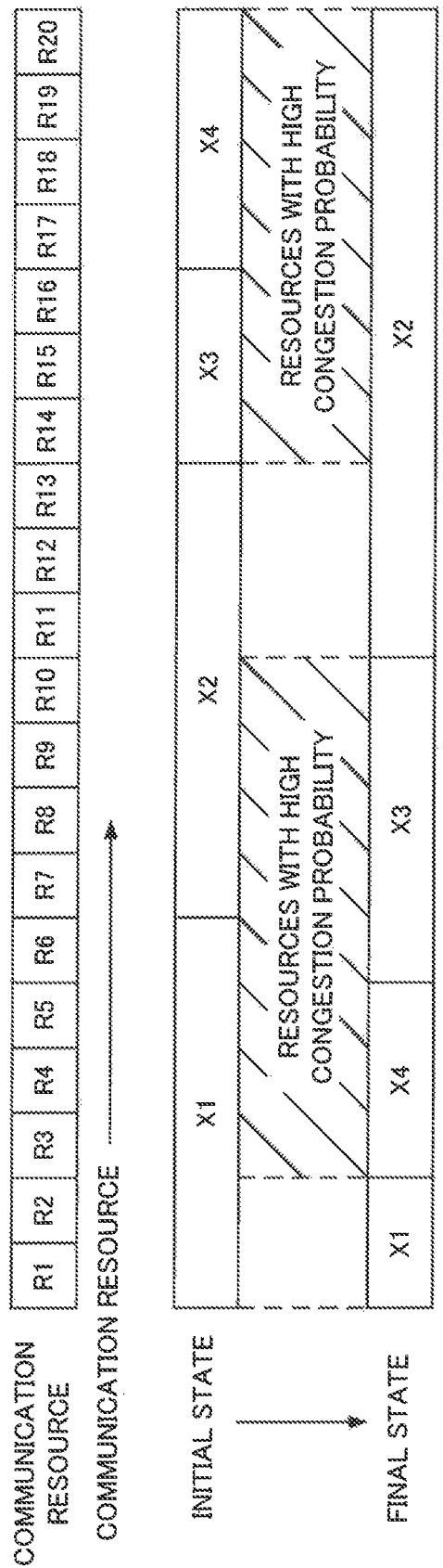
FIG. 7 is a diagram illustrating examples of an initial state and a final state that represent communication resource allocation.
Figure 11:
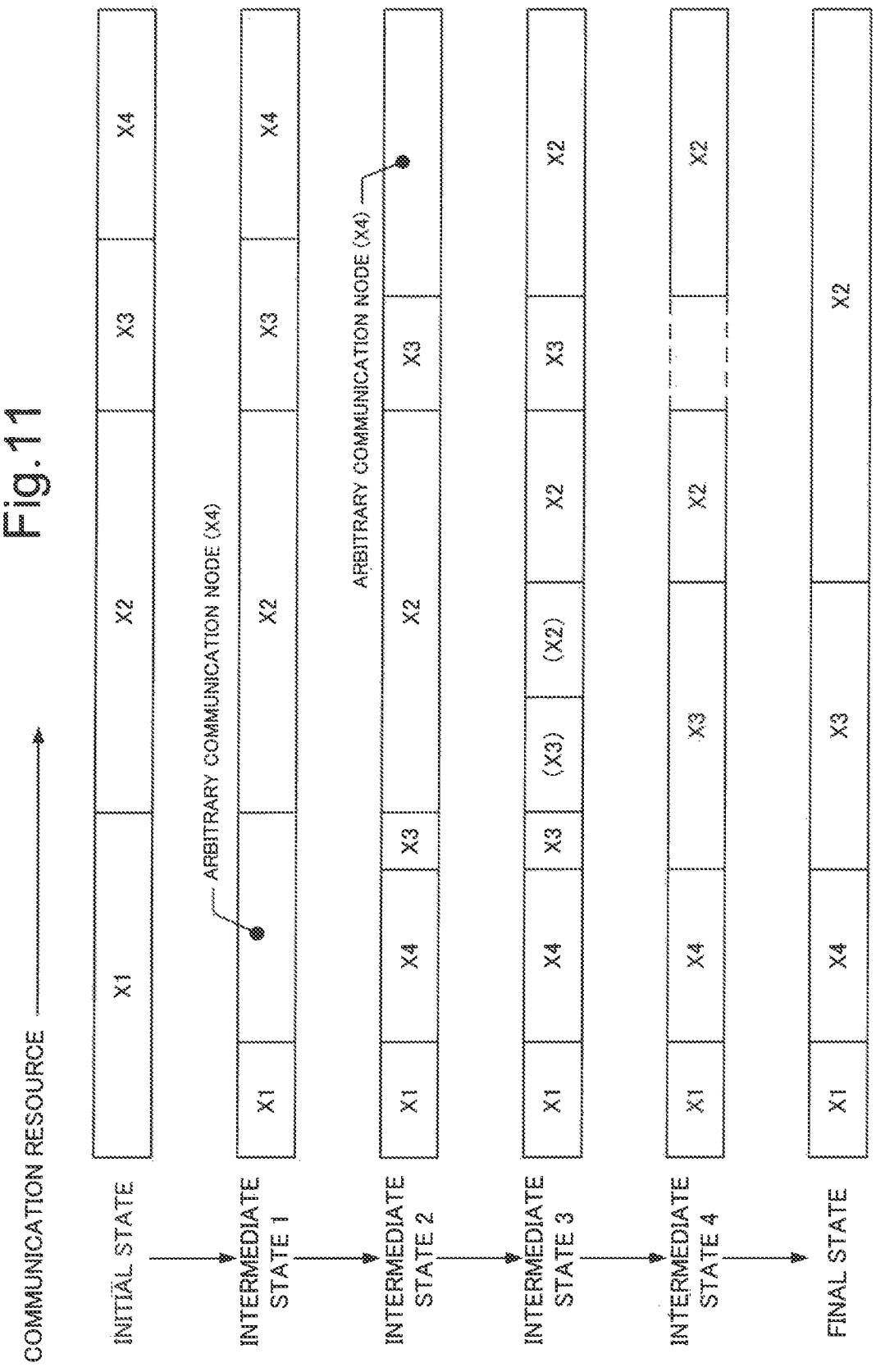
FIG. 11 is a diagram illustrating other examples of intermediate states when the initial state is changed to the final state, the states being illustrated in FIG. 7.
Figure 12:
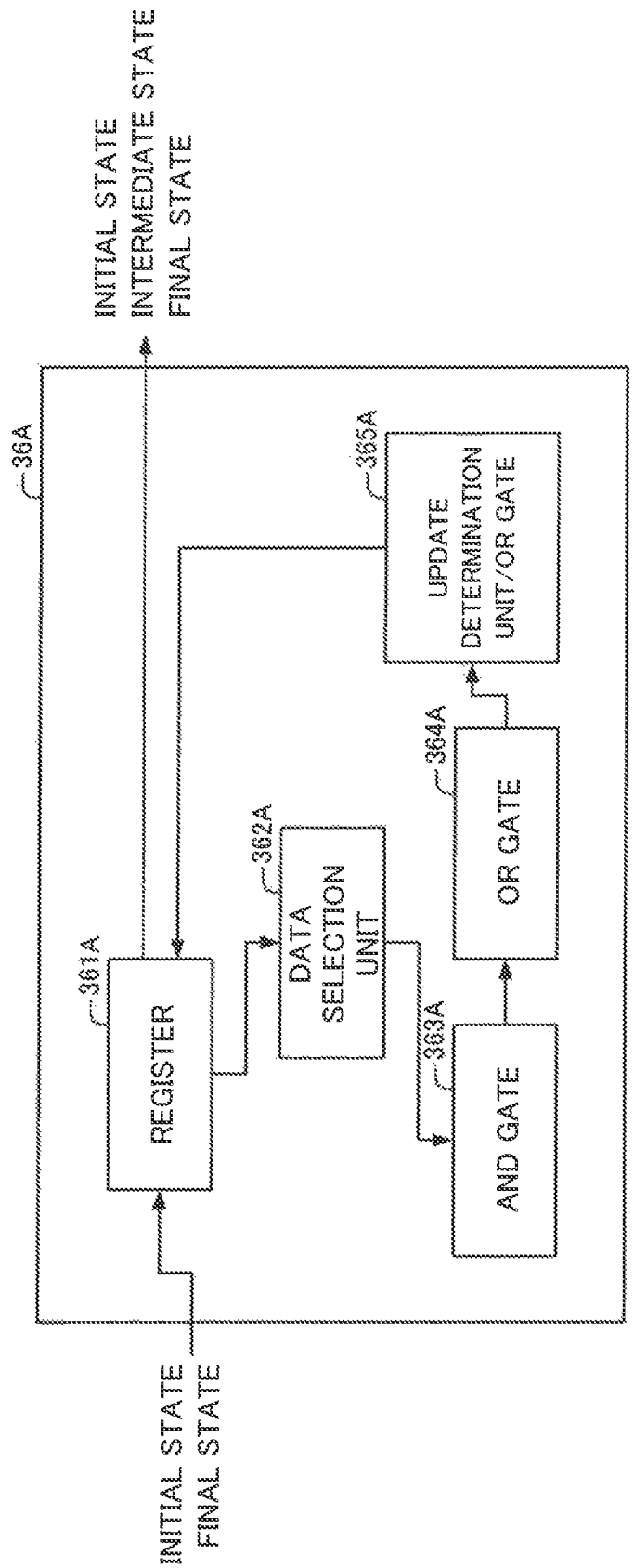
FIG. 12 is a diagram illustrating a configuration example of a communication resource allocation computation processing unit illustrated in FIG. 6.
Figure 13:
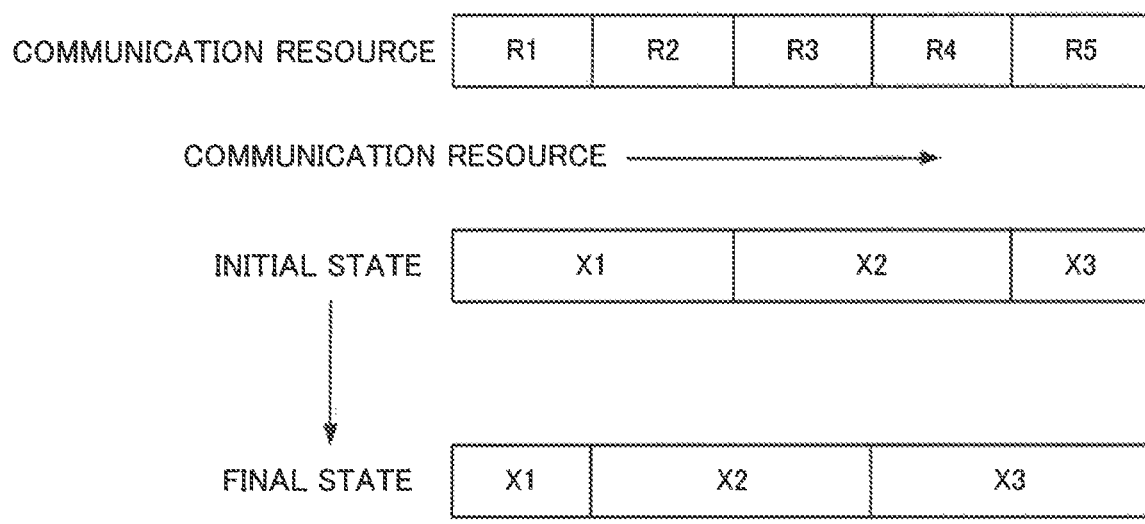
FIG. 13 is a diagram illustrating examples of an initial state and a final state that represent communication resource allocation.
Figure 14:
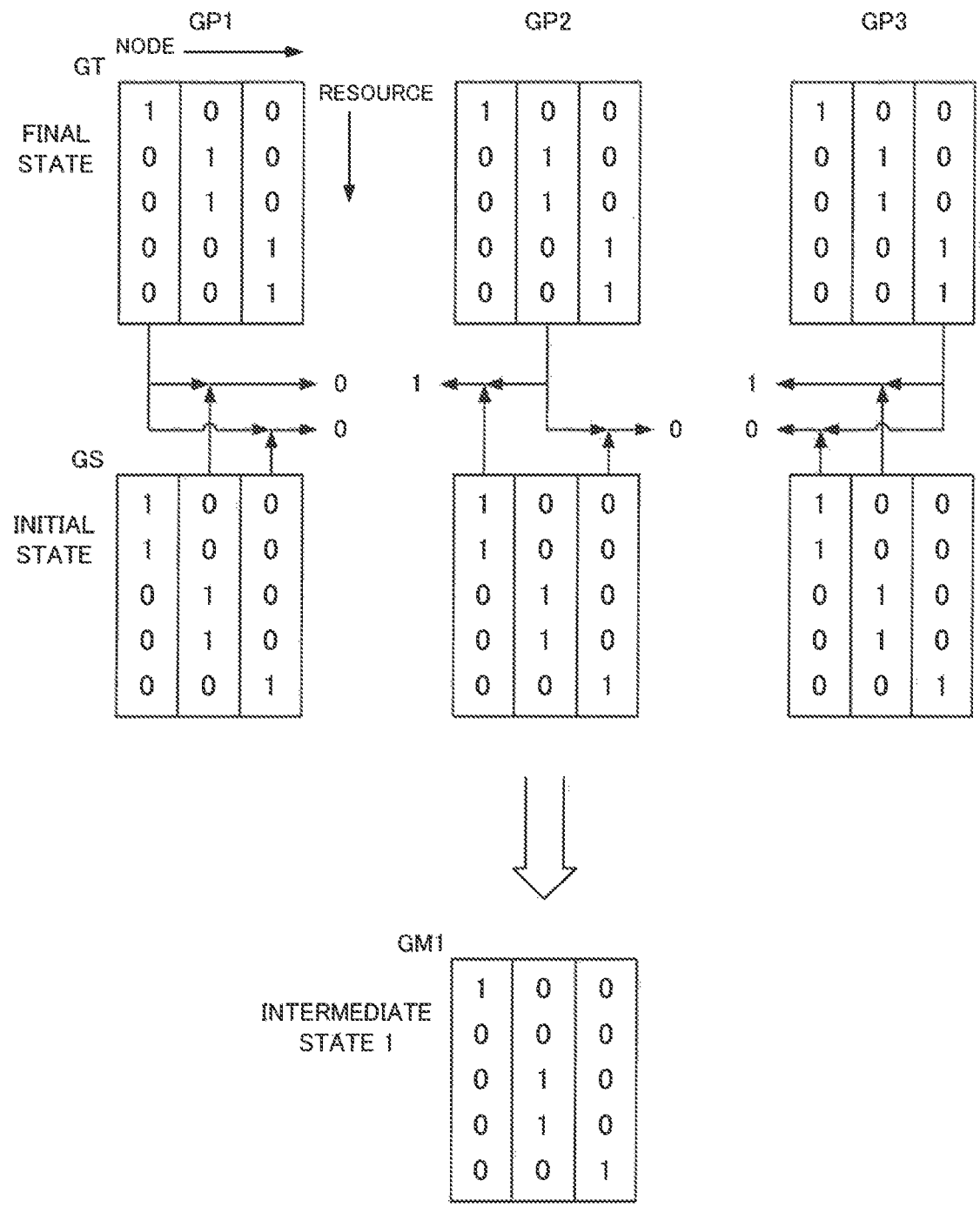
FIG. 14 is a diagram illustrating an example of processing in the communication resource allocation computation processing unit illustrated in FIG. 12.
Figure 15:
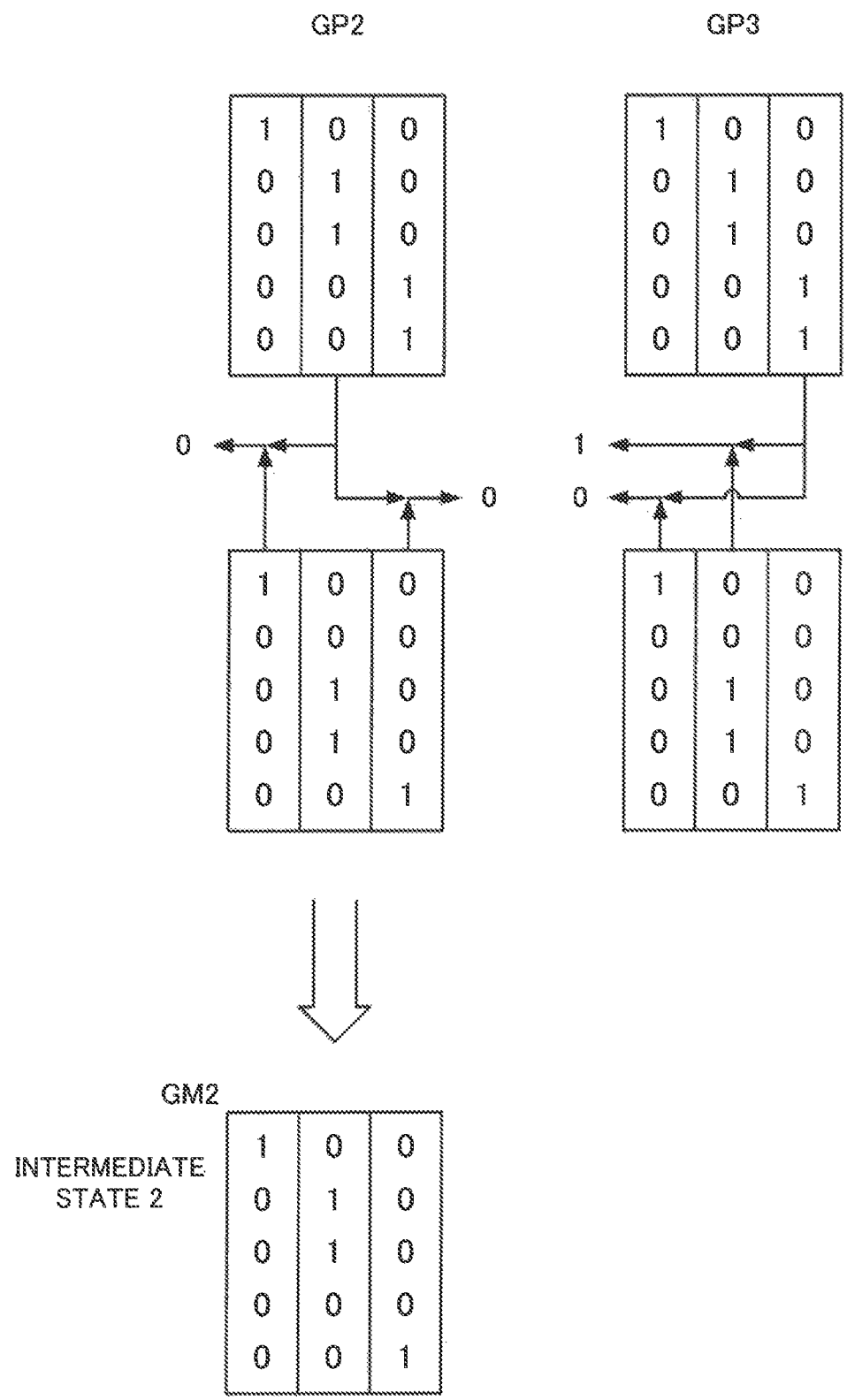
FIG. 15 is a diagram illustrating an example of processing in the communication resource allocation computation processing unit illustrated in FIG. 12.
Figure 16:
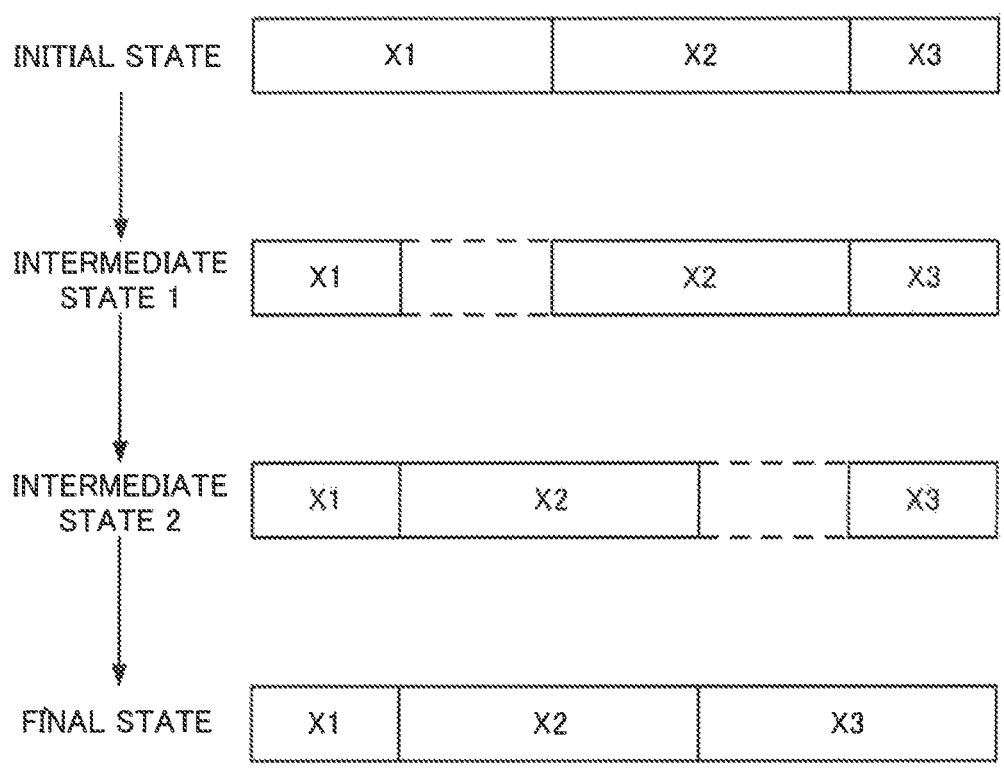
FIG. 16 is a diagram illustrating examples of intermediate states generated by the communication resource allocation computation processing unit from the initial state and the final state that are illustrated in FIG. 13.
Figure 17:
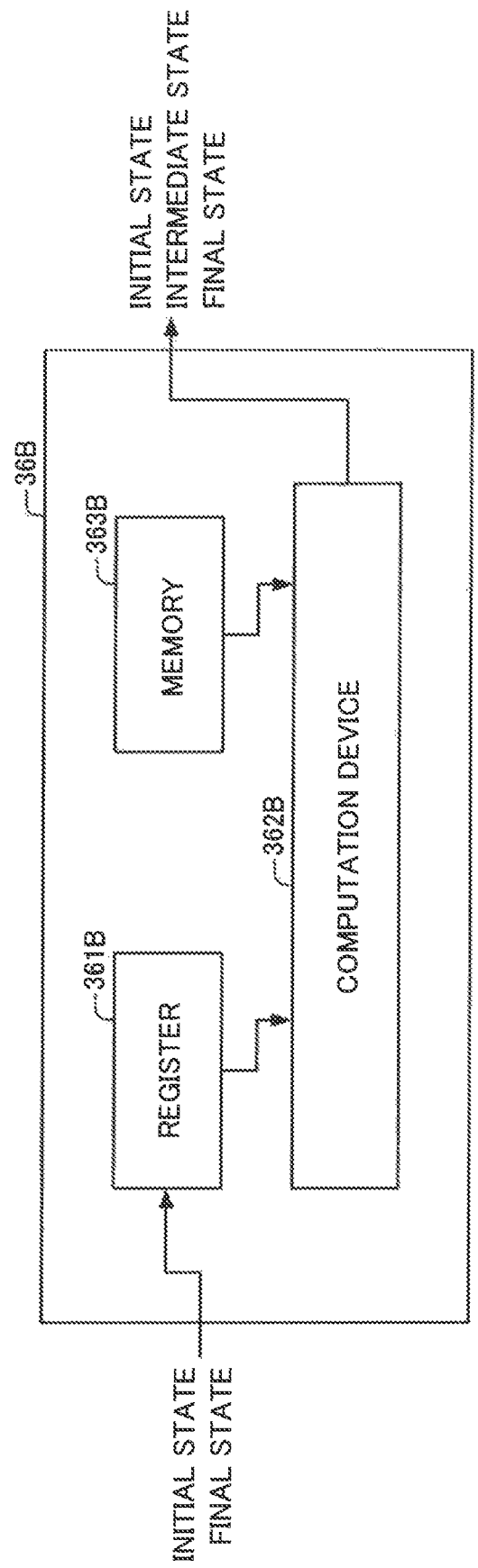
FIG. 17 is a diagram illustrating another configuration example of the communication resource allocation computation processing unit illustrated in FIG. 6.
Figure 18:
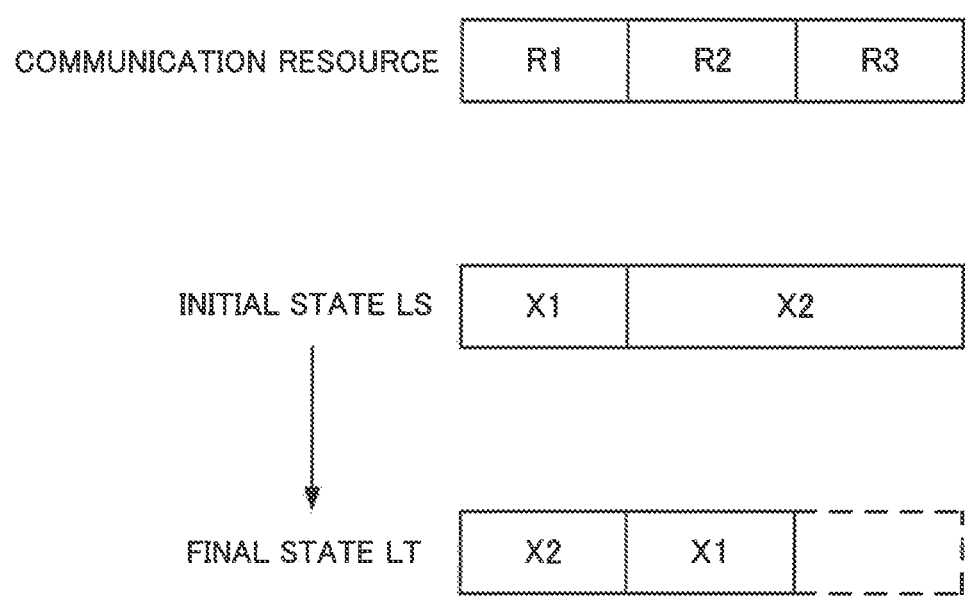
FIG. 18 is a diagram illustrating examples of an initial state and a final state that represent communication resource allocation.
Figure 19:
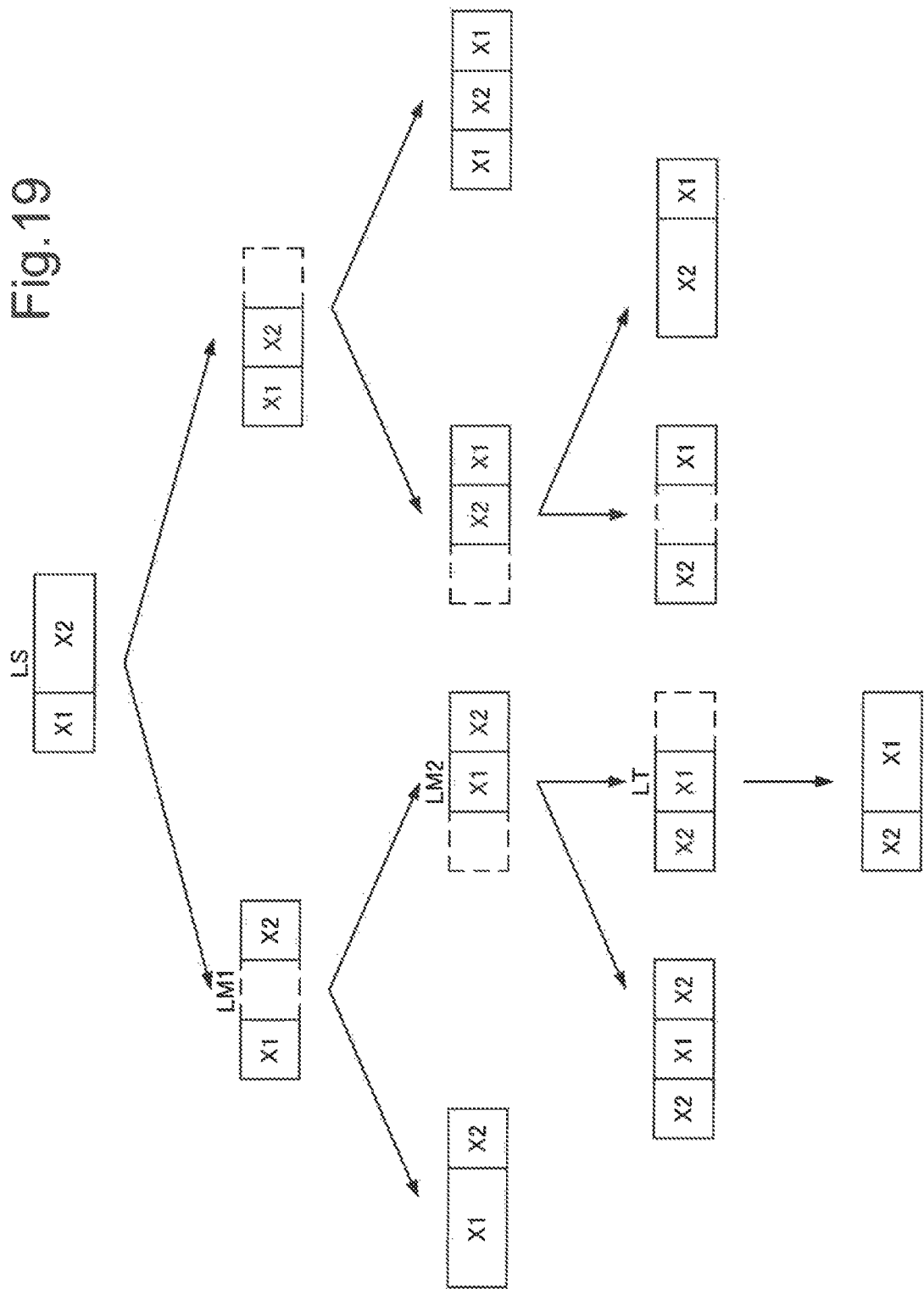
FIG. 19 is a diagram illustrating an example of processing in the communication resource allocation computation processing unit illustrated in FIG. 17.
Figure 20:
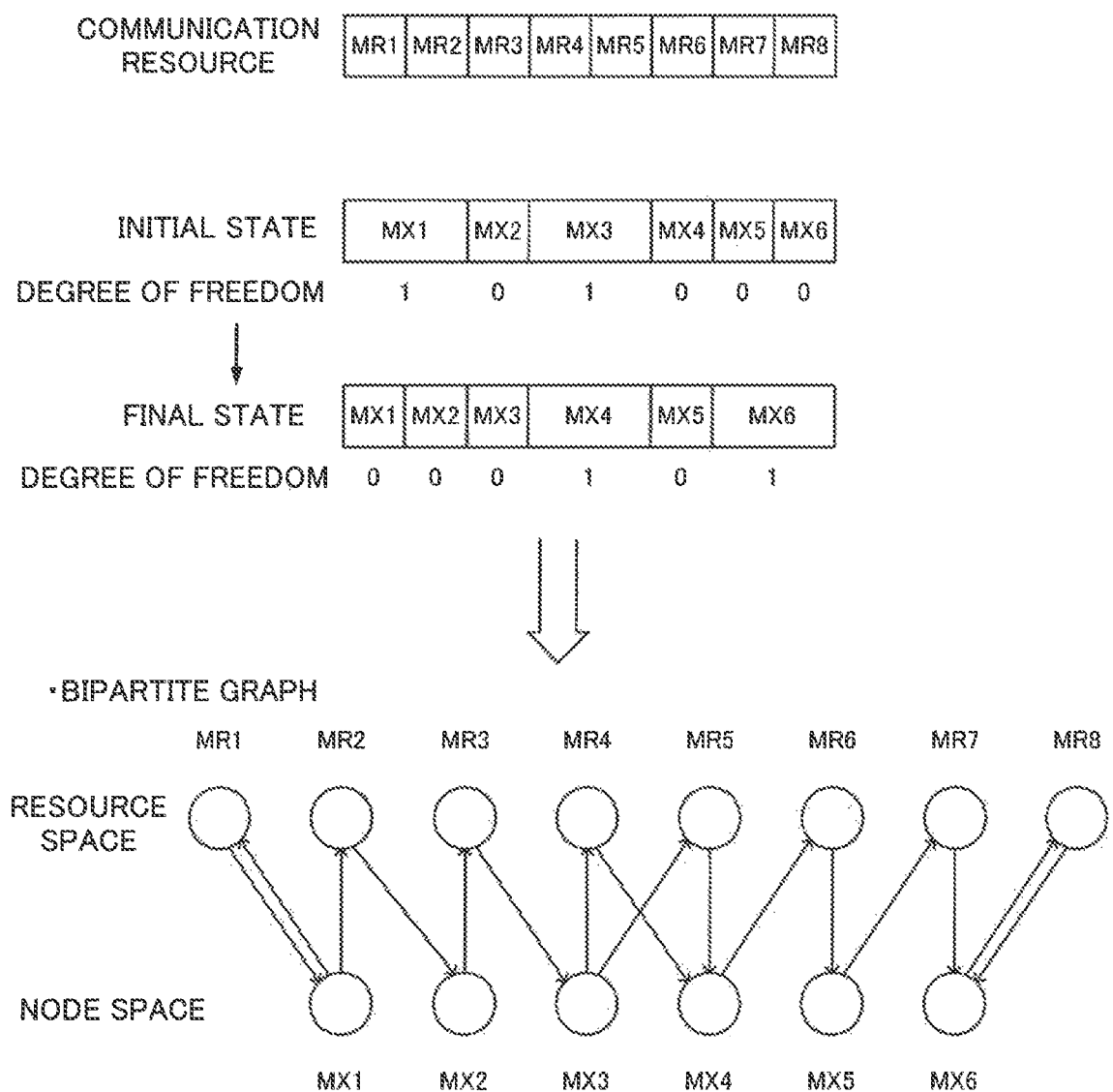
FIG. 20 is a diagram illustrating examples of an initial state and a final state that represent communication resource allocation.
Figure 21:
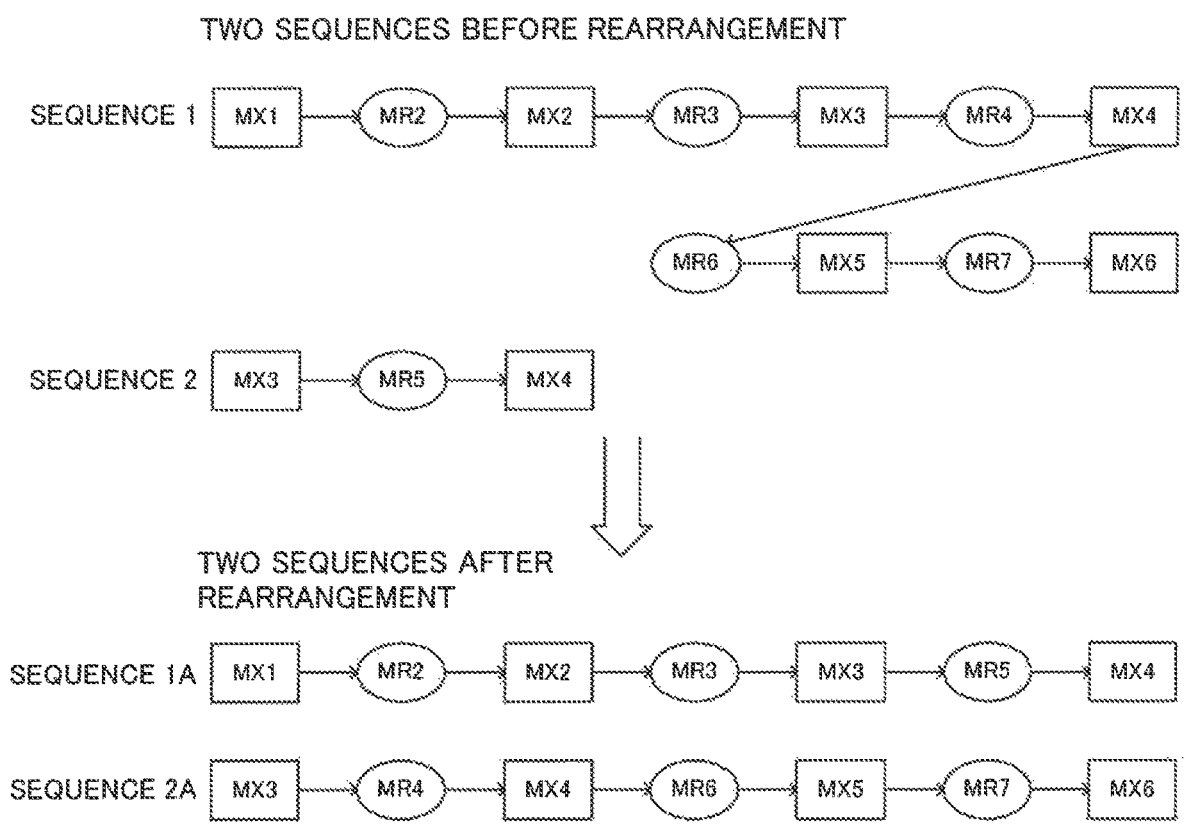
FIG. 21 is a diagram illustrating an example of another type of processing in the communication resource allocation computation processing unit illustrated in FIG. 17.
Figure 22:
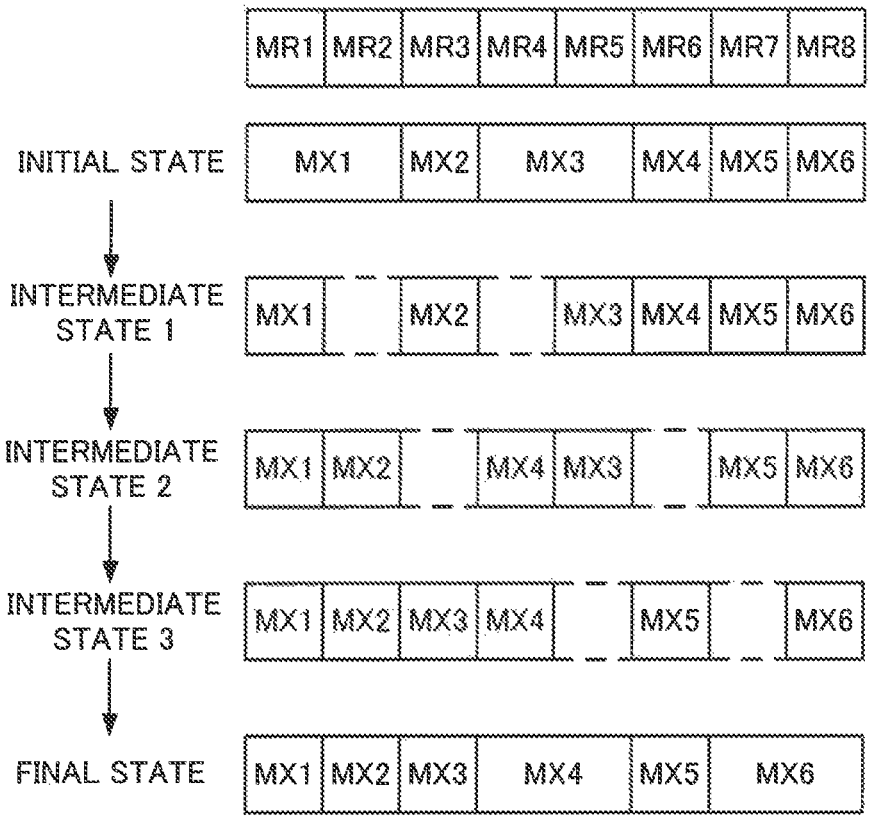
FIG. 22 is a diagram illustrating examples of intermediate states generated by the communication resource allocation computation processing unit from the initial state and the final state that are illustrated in FIG. 20.
Figure 23:
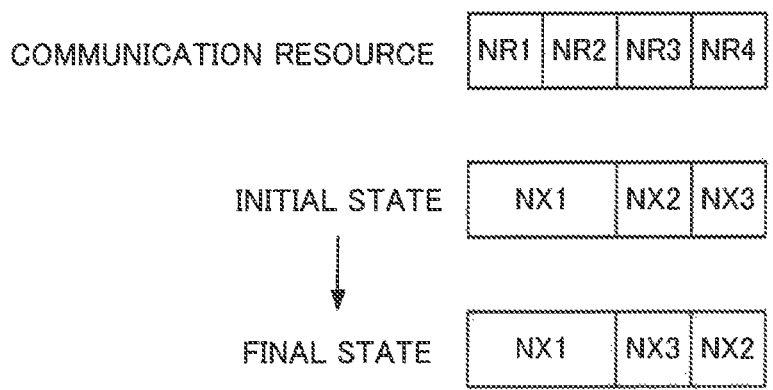
FIG. 23 is a diagram illustrating examples of an initial state and a final state that represent communication resource allocation.
Figure 24:
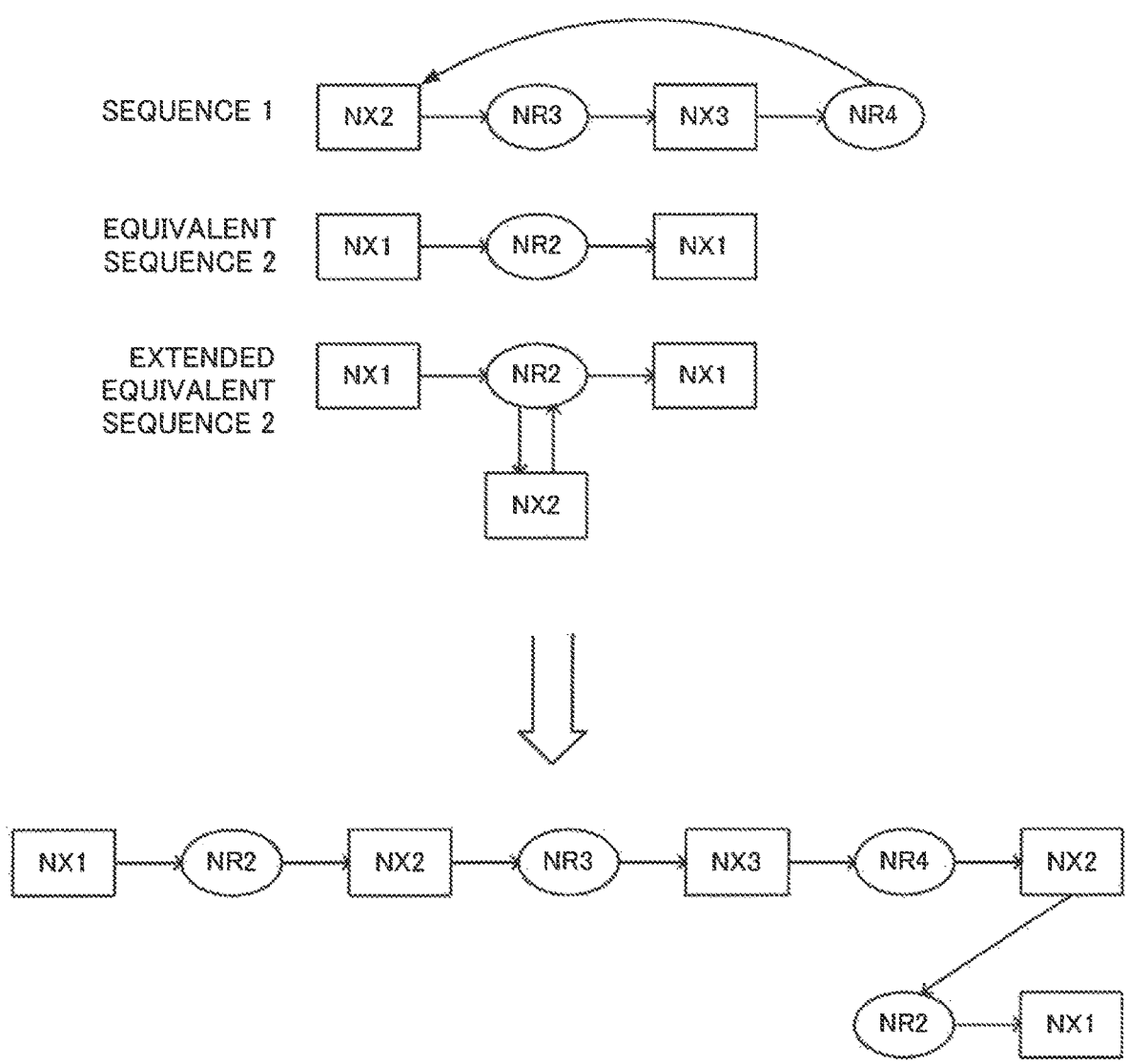
FIG. 24 is a diagram illustrating an example of another type of processing in the communication resource allocation computation processing unit illustrated in FIG. 17.
Figure 25:
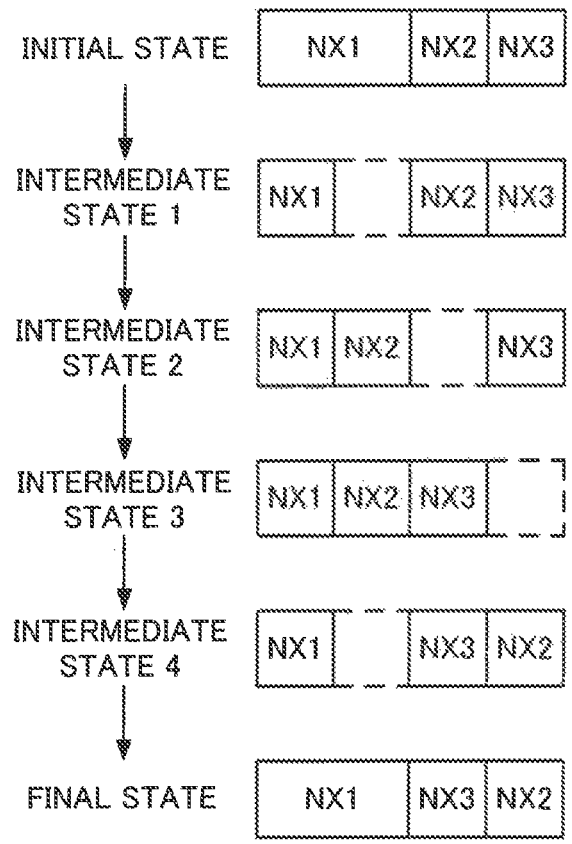
FIG. 25 is a diagram illustrating examples of intermediate states generated by the communication resource allocation computation processing unit from the initial state and the final state that are illustrated in FIG. 23.
Figure 26:
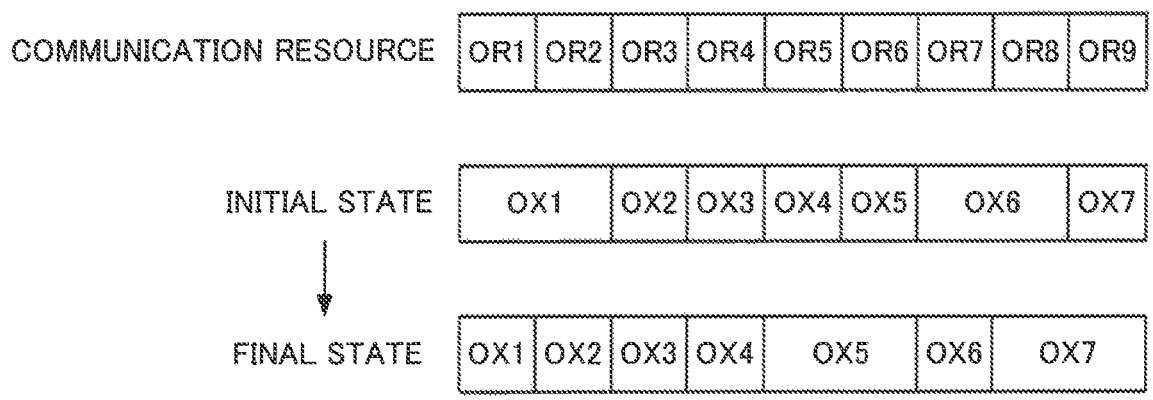
FIG. 26 is a diagram illustrating examples of an initial state and a final state that represent communication resource allocation.
Figure 27:
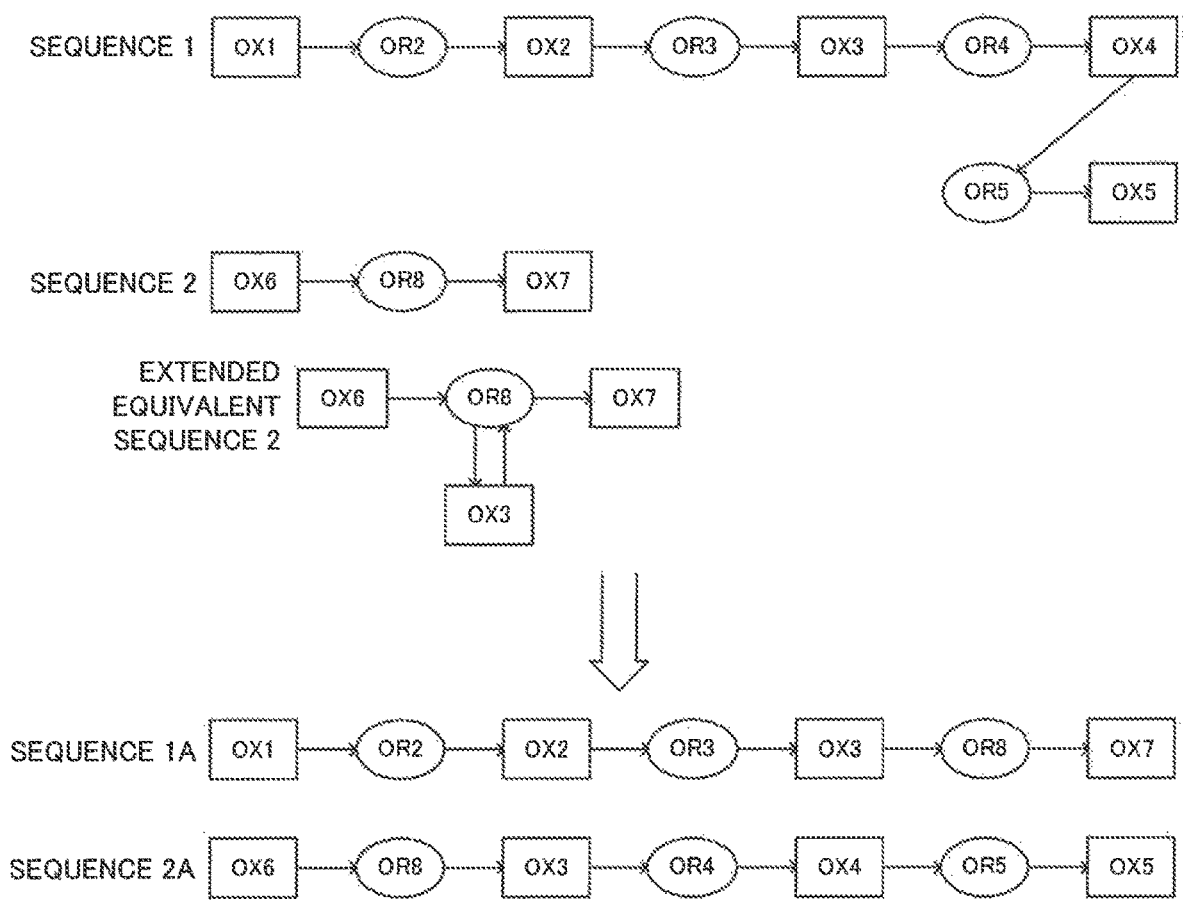
FIG. 27 is a diagram illustrating an example of another type of processing in the communication resource allocation computation processing unit illustrated in FIG. 17.
Figure 28:
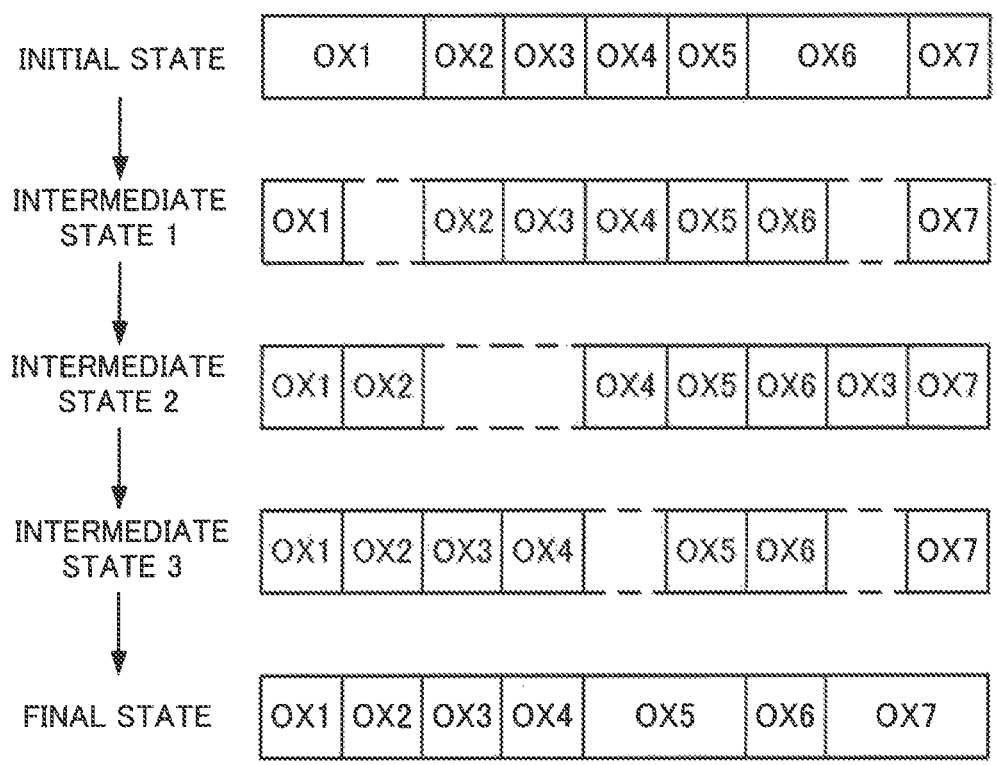
FIG. 28 is a diagram illustrating examples of intermediate states generated by the communication resource allocation computation processing unit from the initial state and the final state that are illustrated in FIG. 26.
Figure 29:
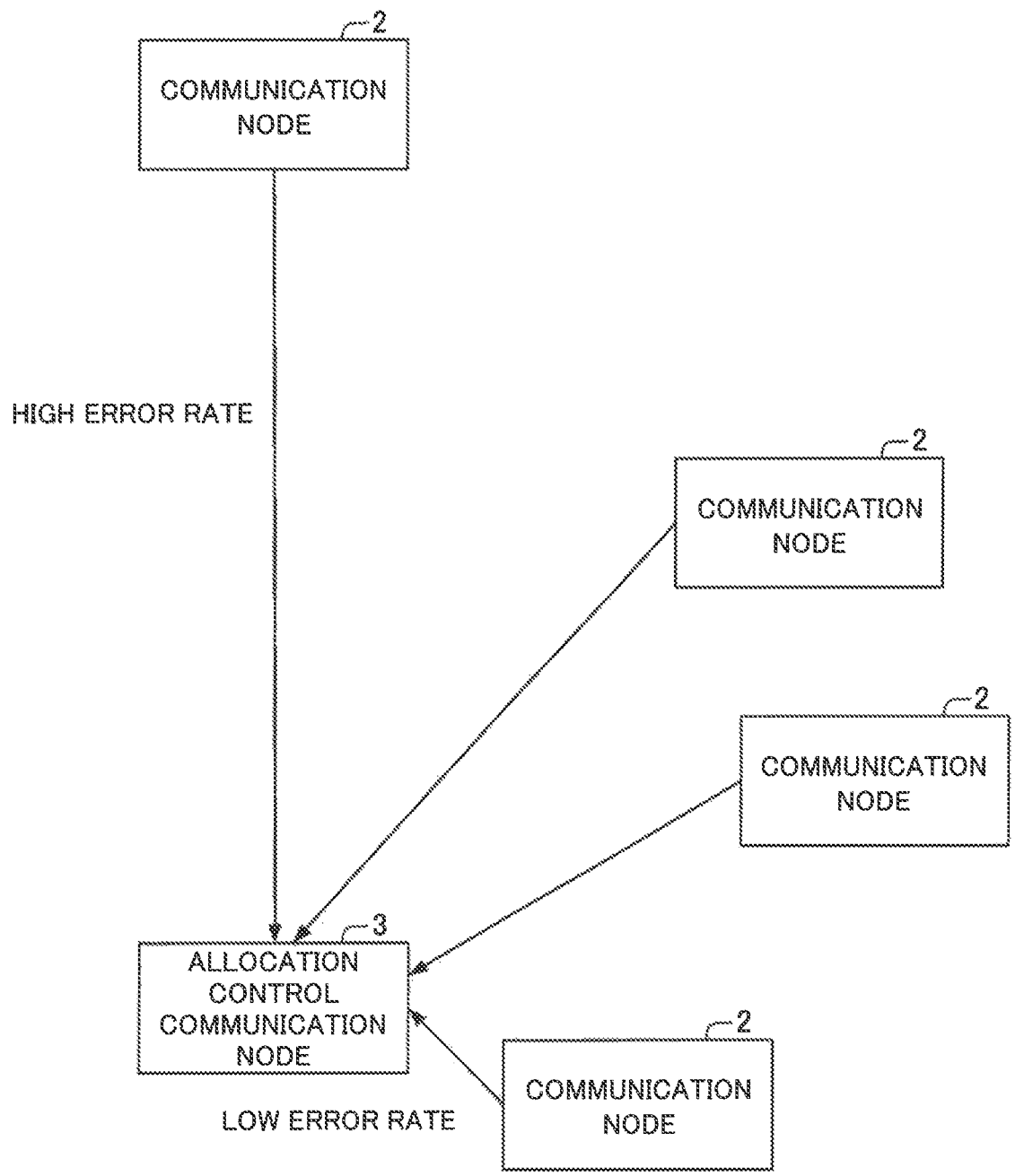
FIG. 29 is a diagram illustrating an example of status of the communication system.
Figure 30:
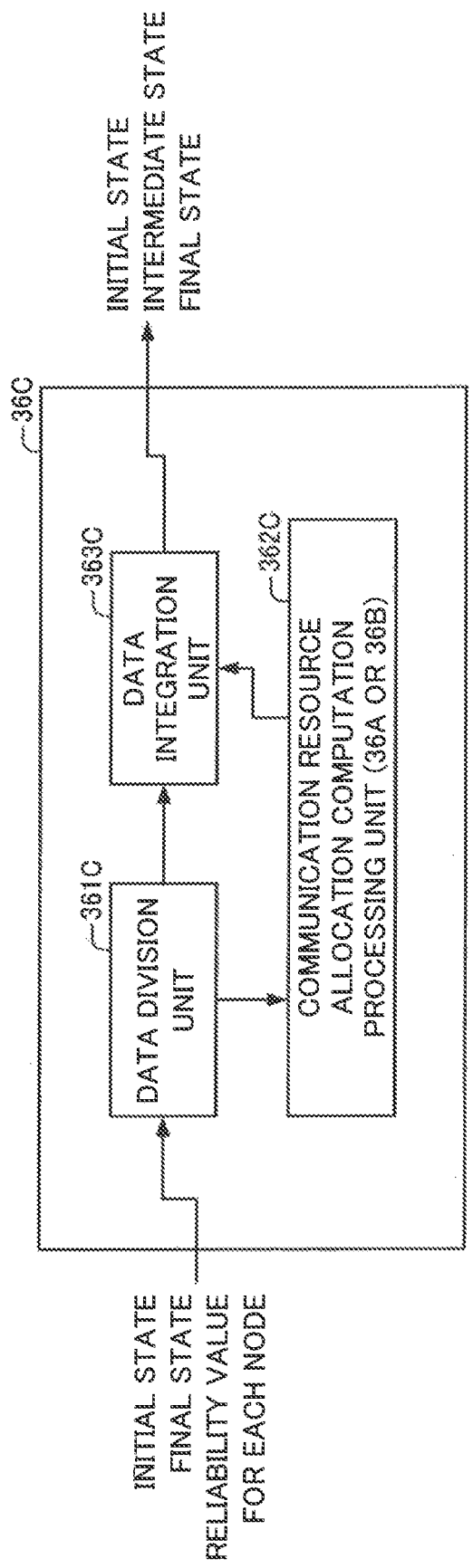
FIG. 30 is a diagram illustrating another configuration example of the communication resource allocation computation processing unit illustrated in FIG. 6.
Figure 31:
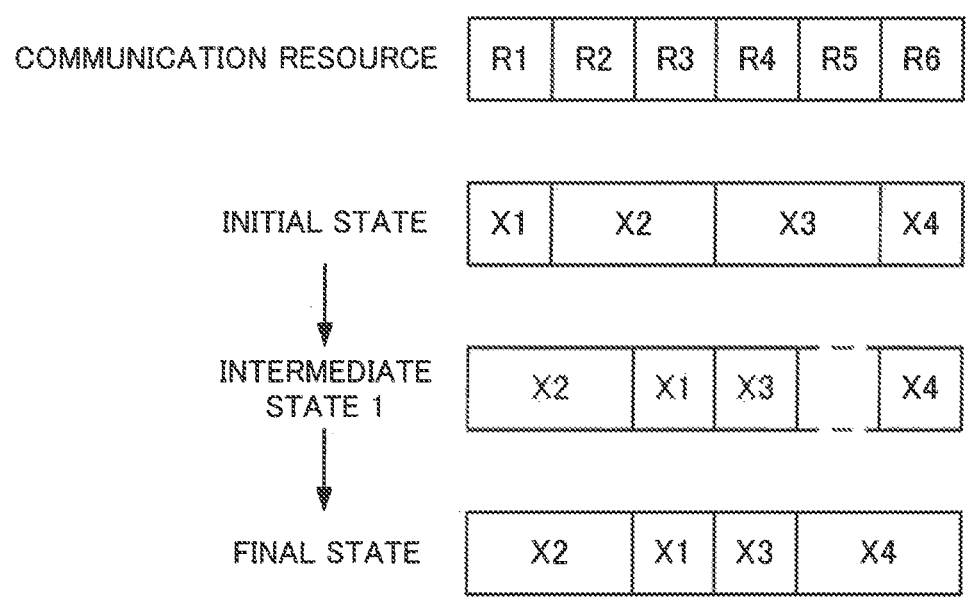
FIG. 31 is a diagram illustrating an example of an intermediate state generated by the communication resource allocation computation processing unit illustrated in FIG. 30.
Figure 32:
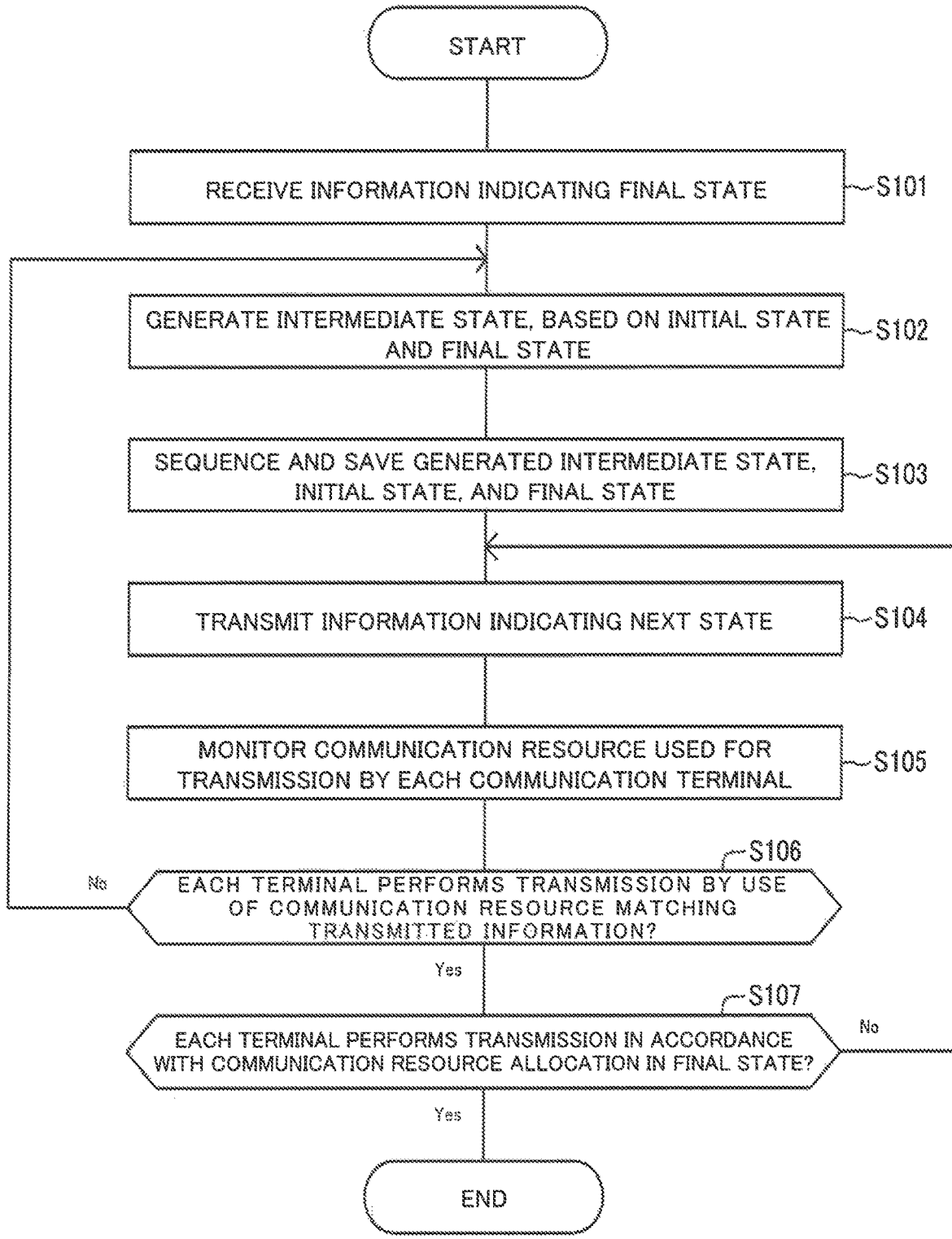
FIG. 32 is a flowchart illustrating an operation example of the allocation control node according to the first example embodiment of the present invention.

FIG. 5 is a diagram illustrating a configuration example of a communication node 2. FIG. 6 is a diagram illustrating a configuration example of an allocation control communication node 3. FIG. 7 is a diagram illustrating examples of an initial state and a final state that represent communication resource allocation. FIGS. 8 to 11 are diagrams illustrating examples of intermediate states when the initial state is changed to the final state, the states being illustrated in FIG. 7. FIG. 12 is a diagram illustrating a communication resource allocation computation processing unit 36A being an example of a configuration of a communication resource allocation computation processing unit 36. FIG. 13 is a diagram illustrating examples of an initial state and a final state. FIGS. 14 to 15 are diagrams illustrating examples of processing in the communication resource allocation computation processing unit 36A. FIG. 16 is a diagram illustrating examples of intermediate states generated by the communication resource allocation computation processing unit 36A from the initial state and the final state that are illustrated in FIG. 13. FIG. 17 is a diagram illustrating a communication resource allocation computation processing unit 36B being an example of another configuration of the communication resource allocation computation processing unit 36. FIG. 18 is a diagram illustrating examples of an initial state and a final state. FIG. 19 is a diagram illustrating an example of processing in the communication resource allocation computation processing unit 36B. FIG. 20 is a diagram illustrating examples of an initial state and a final state. FIG. 21 is a diagram illustrating an example of another type of processing in the communication resource allocation computation processing unit 36B. FIG. 22 is a diagram illustrating examples of intermediate states generated by the communication resource allocation computation processing unit 36B from the initial state and the final state that are illustrated in FIG. 20. FIG. 23 is a diagram illustrating examples of an initial state and a final state. FIG. 24 is a diagram illustrating an example of another type of processing in the communication resource allocation computation processing unit 36B. FIG. 25 is a diagram illustrating examples of intermediate states generated by the communication resource allocation computation processing unit 36B from the initial state and the final state that are illustrated in FIG. 23. FIG. 26 is a diagram illustrating examples of an initial state and a final state. FIG. 27 is a diagram illustrating an example of another type of processing in the communication resource allocation computation processing unit 36B. FIG. 28 is a diagram illustrating examples of intermediate states generated by the communication resource allocation computation processing unit 36B from the initial state and the final state that are illustrated in FIG. 26. FIG. 29 is a diagram illustrating an example of status of the communication system 1. FIG. 30 is a diagram illustrating a communication resource allocation computation processing unit 36C being an example of another configuration of the communication resource allocation computation processing unit 36. FIG. 31 is a diagram illustrating an example of an intermediate state generated by the communication resource allocation computation processing unit 36C. FIG. 32 is a flowchart illustrating an operation example of the allocation control communication node 3.

The communication system 1 according to the first example embodiment of the present invention including the communication node 2 performing communication by use of a previously allocated communication resource (also referred to as a radio wave resource, e.g. a time domain and a frequency domain; a frequency bandwidth being a representative) and the allocation control communication node 3 allocating a communication resource to the communication node 2 will be described. When receiving a final state (an allocation state of a communication resource, the state being different from an initial state) representing communication resource allocation from a control application 37 or the like, the allocation control communication node 3 in the communication system 1 according to the present example embodiment changes communication resource allocation to each communication node 2 from the initial state to the final state. As will be described later, when changing communication resource allocation to each communication terminal from the initial state to the final state, the allocation control communication node 3 generates at least one intermediate state in such a way that a congestion state due to the change does not occur. Then, the allocation control communication node 3 changes communication resource allocation to each communication node 2 from the initial state to the final state via the intermediate state.

Methods of allocating communication resources (mainly in a fixed manner) to a plurality of communication nodes 2 include various methods known as multiple access systems. For example, separate time domains are allocated to respective communicators in a time division multiple access (TDMA) system. Similarly, there are a frequency division multiple access (FDMA) system, polarization division multiple access (PDMA), a code division multiple access (CDMA) system, an orthogonal frequency division multiple access (OFDMA) system, a spatial division multiple access (SDMA) system, a non-orthogonal multiple access system (NOMA), and the like.

The multiple access systems exemplified above are based on multiplexing systems related to the respective multiple access systems. A multiplexing system is a system logically dividing a signal on a single transmission line. For example, in time division multiplexing (TDM), each piece of time domain divided into several pieces may be handled as an independent transmission line, as illustrated in FIG. 1. Each of such logically divided transmission line is herein referred to as a "communication resource."

Further, for example, as illustrated in FIG. 2, a communication resource allocation method may combine a plurality of systems, such as combining TDM with orthogonal frequency division multiplexing (OFDM). In FIG. 2, X1, X2, X3, X4, and X5 denote five communication nodes 2 and illustrate status of the respective communication nodes 2 using an entire communication resource divided into pieces. Referring to FIG. 2, there are three OFDM resources (OR1, OR2, OR3), and there are also three TDM resources (TR1, TR2, TR3). Accordingly, there are a total of nine communication resources. Accordingly, in the case of FIG. 2, the five communication nodes 2 perform communication by use of the nine communication resources.

The communication resources may not necessarily be previously fixed or mutually orthogonal. For example, as is performed in multiple input multiple output (MIMO), when original communication resources are denoted as e_1, e_2, e_3, ..., and e_N, a linear combination thereof or the like may also be a new communication resource. In this case, the resulting linear combination is allocated to K communication nodes 2.

The communication system 1 described in the present example embodiment may use any of the multiple access systems described above for allocating communication resources. For convenience of description, time domains in TDM are assumed as communication resource in the following description.

Referring to FIG. 3, the communication system 1 includes the communication node 2 (communication device) and the allocation control communication node 3 (communication control device). As illustrated in FIG. 4, for example, a mobile station may be assumed as the communication node 2. Further, for example, a base station may be assumed as the allocation control communication node 3.

Roles of the communication node 2 and the allocation control communication node 3 do not necessarily need to be fixed. For example, when including a required configuration, the allocation control communication node 3 may behave as the communication node 2. Further, when including hardware or software for allocation control, to be described later, the communication node 2 may behave as the allocation control communication node 3. Thus, the roles of control and controlled may be freely exchanged.

A communication node 2 receives allocation information indicating communication resource allocation allocated to the communication node 2 from the allocation control communication node 3. Then, the communication node 2 transmits user data by use of an allocated communication resource (in an allocated time domain).

FIG. 5 is a configuration example of the communication node 2. Referring to FIG. 5, for example, the communication node 2 includes an antenna 20, a modulator-demodulator 21, a controlled register 22, a transmission switch 23, and a transmission-reception data storage device 24.

The antenna 20 is a physical interface in wireless communication. The communication node 2 transmits and receives signals to and from another communication node 2 and the allocation control communication node 3 through the antenna 20.

The modulator-demodulator 21 demodulates a received signal received by the antenna 20 and extracts data. Then, the modulator-demodulator 21 stores the extracted data into the controlled register 22 and the transmission-reception data storage device 24. Further, for example, the modulator-demodulator 21 modulates data into a transmitted signal in accordance with an instruction from the transmission switch 23. The transmitted signal modulated by the modulator-demodulator 21 is transmitted to another communication node 2 and the allocation control communication node 3 through the antenna 20.

The controlled register 22 holds allocation information indicating communication resource allocation to the local device. The allocation information held by the controlled register 22 is used by the transmission switch 23.

By referring to allocation information held by the controlled register 22, the transmission switch 23 controls the modulator-demodulator 21 in such a way as to transmit a transmitted signal by use of a communication resource allocated to the local device. The transmission switch 23 according to the present example embodiment controls the modulator-demodulator 21 in such a way as to transmit a transmitted signal in a transmission time domain allocated to the local device.

The transmission-reception data storage device 24 is a storage device such as a buffer or a memory for user data, the storage device holding user data out of data demodulated by the modulator-demodulator 21. The communication node 2 may not include the transmission-reception data storage device 24.

For example, the communication node 2 includes such a configuration. For example, by including a configuration as illustrated in FIG. 5, the communication node 2 is able to receive allocation information and transmit user data based on the allocation information. On the other hand, when including a configuration as illustrated in FIG. 5, the communication node 2 is not able to control communication resource allocation.

The communication node 2 may be configured to make some control response to the allocation control communication node 3 when receiving allocation information from the allocation control communication node 3.

While performing communication being transmission of regular user data to and from communication nodes 2, the allocation control communication node 3 notifies each communication node 2 of allocation information indicating communication resource allocation. The allocation control communication node 3 may perform communication resource allocation with each communication node 2 being an only target, or may perform communication resource allocation including the local node (the allocation control communication node 3 itself notifying allocation information). For ease of description, a case of the allocation control communication node 3 allocating a communication resource to each communication node 2 will be described below.

FIG. 6 is a configuration example of the allocation control communication node 3. Referring to FIG. 6, for example, the allocation control communication node 3 includes an antenna 30, a modulator-demodulator 31, a controlled register 32, a transmission switch 33, a transmission-reception data storage device 34, a communication monitoring unit 35, a communication resource allocation computation processing unit 36, a control memory/step counter 38, and a control register 39, and is connected to a control application 37.

The antenna 30, the modulator-demodulator 31, and the transmission switch 33 function as a transmission unit. A configuration including the antenna 30, the modulator-demodulator 31, and the transmission switch 33, and the transmission-reception data storage device 34 is similar to the configuration of the communication node 2. Accordingly, detailed description thereof is omitted.

The controlled register 32 holds allocation information indicating communication resource allocation to the local device. The controlled register 32 is used when holding allocation information received from another allocation control communication node 3 and operates similarly to the controlled register 22 in the communication node 2.

By the allocation control communication node 3 including the controlled register 32, the roles of control and controlled may be exchanged. However, the allocation control communication node 3 may not necessarily include the controlled register 32.

The communication monitoring unit 35 monitors a received signal received by the antenna 30. Specifically, by monitoring a received signal, the communication monitoring unit 35 monitors whether or not each communication node 2 performs communication in accordance with allocation information notified the previous time. In other words, the communication monitoring unit 35 determines whether or not each communication node 2 performs communication by use of a communication resource allocated to the communication node 2. Whether to advance a counter in the control memory/step counter 38, or the like is determined based on a communication result by the communication monitoring unit 35.

When changing a communication resource allocation state to each communication node 2 from an initial state to a final state, the communication resource allocation computation processing unit 36 (intermediate state generation unit) generates an intermediate state indicating communication resource allocation to each communication node 2, based on the initial state and the final state. For example, the communication resource allocation computation processing unit 36 is composed of a logic circuit and a storage device such as a register. Alternatively, the communication resource allocation computation processing unit 36 includes an unillustrated computation device and a storage device, and provides generation processing of an intermediate state by the computation device executing a program included in the storage device.

For example, the communication resource allocation computation processing unit 36 generates an intermediate state changed from a preceding allocation state (e.g. an initial state or a preceding intermediate state) in such a way that a communication resource is not allocated to a communication node 2 different from a communication node 2 to which the resource is allocated in the preceding allocation state. In other words, the communication resource allocation computation processing unit 36 generates an intermediate state changed from a preceding allocation state in such a way that a communication resource is allocated to a communication node 2 identical to a communication node 2 to which the resource is allocated in the preceding allocation state or the resource is in a state of not being allocated to any communication node 2. Thus, the communication resource allocation computation processing unit 36 generates an intermediate state in such a way that the same communication resource is not allocated to different communication nodes 2 in consecutive allocation states in a time series. Further, the communication resource allocation computation processing unit 36 generates an intermediate state in such a way that a communication resource not allocated to any communication node 2 exists.

Further, for each communication node 2, the communication resource allocation computation processing unit 36 may previously hold an allocation value indicating a lower limit of a communication resource allocated to each communication node 2. When the communication resource allocation computation processing unit 36 holds an allocation value, the communication resource allocation computation processing unit 36 may generate an intermediate state in such a way that a number of communication resources allocated to a communication node 2 is greater than or equal to the allocation value.

Further, the communication resource allocation computation processing unit 36 may be configured to generate an intermediate state by use of reliability information indicating reliability of communication when a communication node 2 performs communication. For example, the communication resource allocation computation processing unit 36 may determine whether or not to permit a state in which the same communication resource is allocated to different communication nodes 2 in consecutive allocation states in a time series, based on reliability information. For example, the reliability information may be acquired by measuring received power of a received signal received from a communication node 2. Alternatively, the reliability information may be acquired based on an error rate or a signal detection rate when transmitting and receiving data to and from a communication node 2.

When the communication resource allocation computation processing unit 36 generates an intermediate state, and a communication resource not allocated to any communication node 2 is included in the generated intermediate state, the communication resource allocation computation processing unit 36 may allocate the communication resource to an arbitrary communication node 2. In other words, subsequently to generating an intermediate state including a communication resource not allocated to any communication node 2, the communication resource allocation computation processing unit 36 may update the generated intermediate state in such a way as to allocate the communication resource not allocated to any communication node 2 in the intermediate state to an arbitrary communication node 2. By thus allocating a communication resource not allocated to any communication node 2 to an arbitrary communication node 2, an intermediate state reducing an overall possibility of congestion can be generated while efficiently using communication resources, although a possibility of partial congestion exists.

A specific configuration of the communication resource allocation computation processing unit 36 and a detailed processing flow of generating an intermediate state will be described later.

The control application 37 specifies a final state being final (objective) allocation of communication resources. The control application 37 may be included in the allocation control communication node 3 or may exist outside the allocation control communication node 3. How to set a final state is not particularly limited, according to the present example embodiment.

The control memory/step counter 38 sequences and holds every intermediate state, initial state, and final state calculated by the communication resource allocation computation processing unit 36. Then, the control memory/step counter 38 performs scheduling by use of a step counter or the like.

For example, the control memory/step counter 38 refers to a monitoring result from the communication monitoring unit and performs control based on the monitoring result. Specifically, when a communication node 2 not performing transmission with a communication resource allocated the previous time exists, as a result of monitoring, the control memory/step counter 38 does not advance a step counter and resend allocation information indicating the same communication resource allocation as the previous time. Alternatively, the control memory/step counter 38 partially advances a step. Alternatively, the control memory/step counter 38 instructs the communication resource allocation computation processing unit 36 to recalculate communication resource allocation. Consequently, the communication resource allocation computation processing unit 36 generates an intermediate state, based on a monitoring result from the communication monitoring unit 35.

On the other hand, when each communication node 2 is determined to perform communication in accordance with allocation information, based on a monitoring result from the communication monitoring unit 35, the control memory/step counter 38 increments the step counter and writes a state indicating next communication resource allocation (an intermediate state or a final state) into the control register 39.

Thus, the control memory/step counter 38 refers to a monitoring result from the communication monitoring unit 35 and performs control based on the monitoring result.

The control register 39 holds allocation information indicating communication resource allocation to each communication node 2 at a next transmission timing. As described above, allocation information to each communication node 2 at a next timing is written into the control register 39 by the control memory/step counter 38.

For example, the allocation control communication node 3 includes such a configuration.

For example, it is assumed that communication resource allocation to communication nodes 2 is changed from an initial state illustrated in FIG. 7 to a final state illustrated in FIG. 7. In this case, performing control of changing the allocation at once, or the like increases a possibility of congestion at a communication resource allocated to different communication nodes 2 between the initial state and the final state. Specifically, in the case illustrated in FIG. 7, there is a possibility of congestion at communication resources R3 to R10, and R14 to R20.

Figure 8:
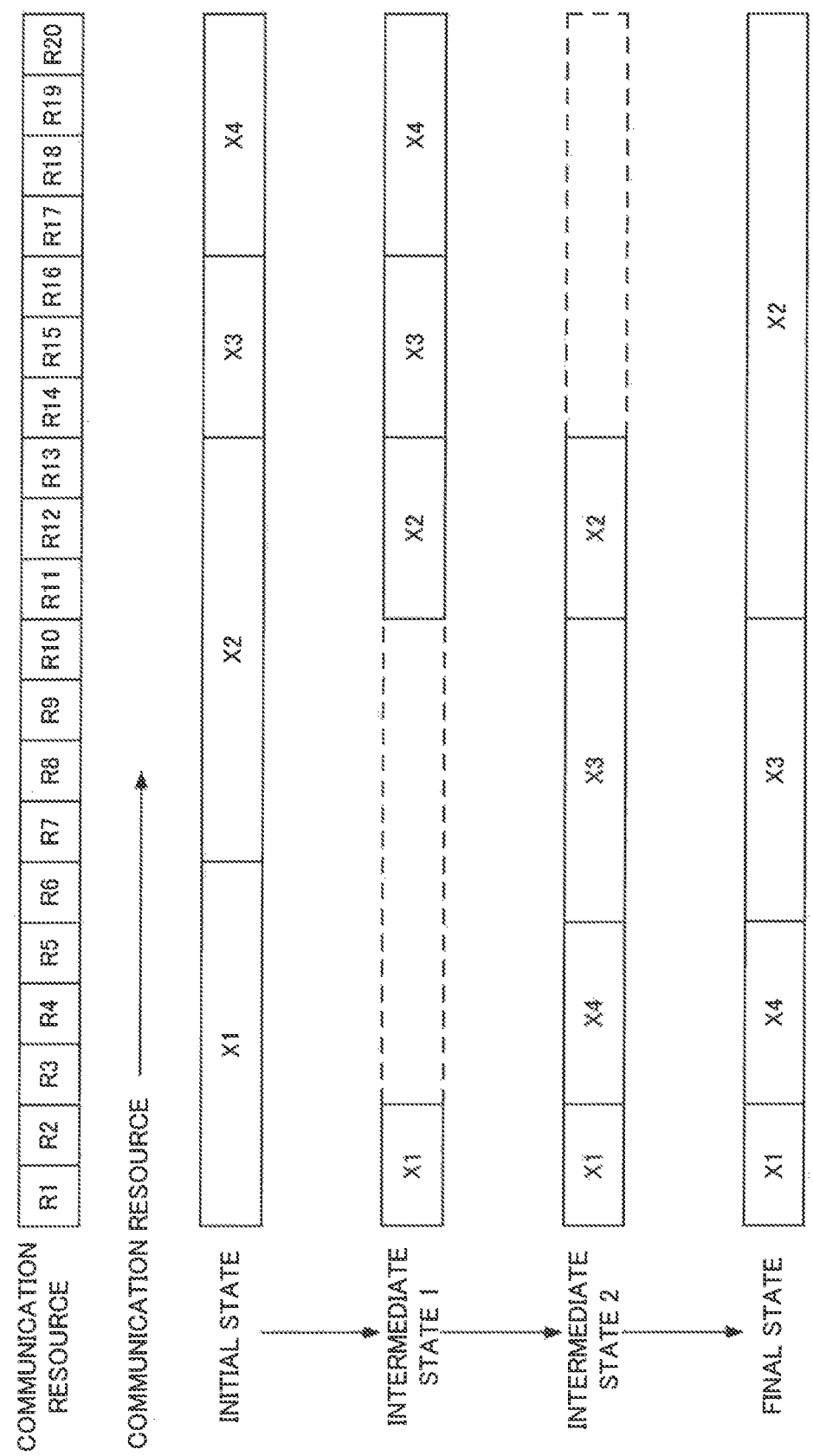
FIG. 8 is a diagram illustrating examples of intermediate states when the initial state is changed to the final state, the states being illustrated in FIG. 7.

Accordingly, for example, the communication resource allocation computation processing unit 36 generates two intermediate states as illustrated in FIG. 8, based on the initial state and the final state that are illustrated in FIG. 7. Referring to an initial state and an intermediate state 1 in FIG. 8, communication resources R1 and R2, and R11 to R20 are allocated to the same communication nodes 2, respectively. Further, communication resources R3 to R10 are not allocated to any communication node 2. Thus, referring to the initial state and the intermediate state 1 in FIG. 8, it is understood that, in the intermediate state 1, a communication resource is not allocated to a communication node 2 different from a communication node 2 to which the resource is allocated in the initial state. Similarly, referring to the intermediate state 1 and an intermediate state 2, in the intermediate state 2, a communication resource is not allocated to a communication node 2 different from a communication node 2 to which the resource is allocated in the intermediate state 1. Further, the same applies to the intermediate state 2 and a final state. Further, referring to FIG. 8, it is understood that a communication resource not allocated to any communication node 2 exists in either of the intermediate state 1 and the intermediate state 2 (e.g. the communication resources R3 to R10 are not allocated to any communication node 2 in the intermediate state 1).

As described above, the communication resource allocation computation processing unit 36 generates an intermediate state in such a way that the same communication resource is not allocated to different communication nodes 2 in consecutive allocation states in a time series. Further, the communication resource allocation computation processing unit generates an intermediate state in such a way that a communication resource not allocated to any communication node 2 exists. By thus generating an intermediate state, the communication resource allocation computation processing unit 36 generates a plurality of intermediate states in such a way that congestion does not possibly occur between consecutive allocation states.

Figure 9:
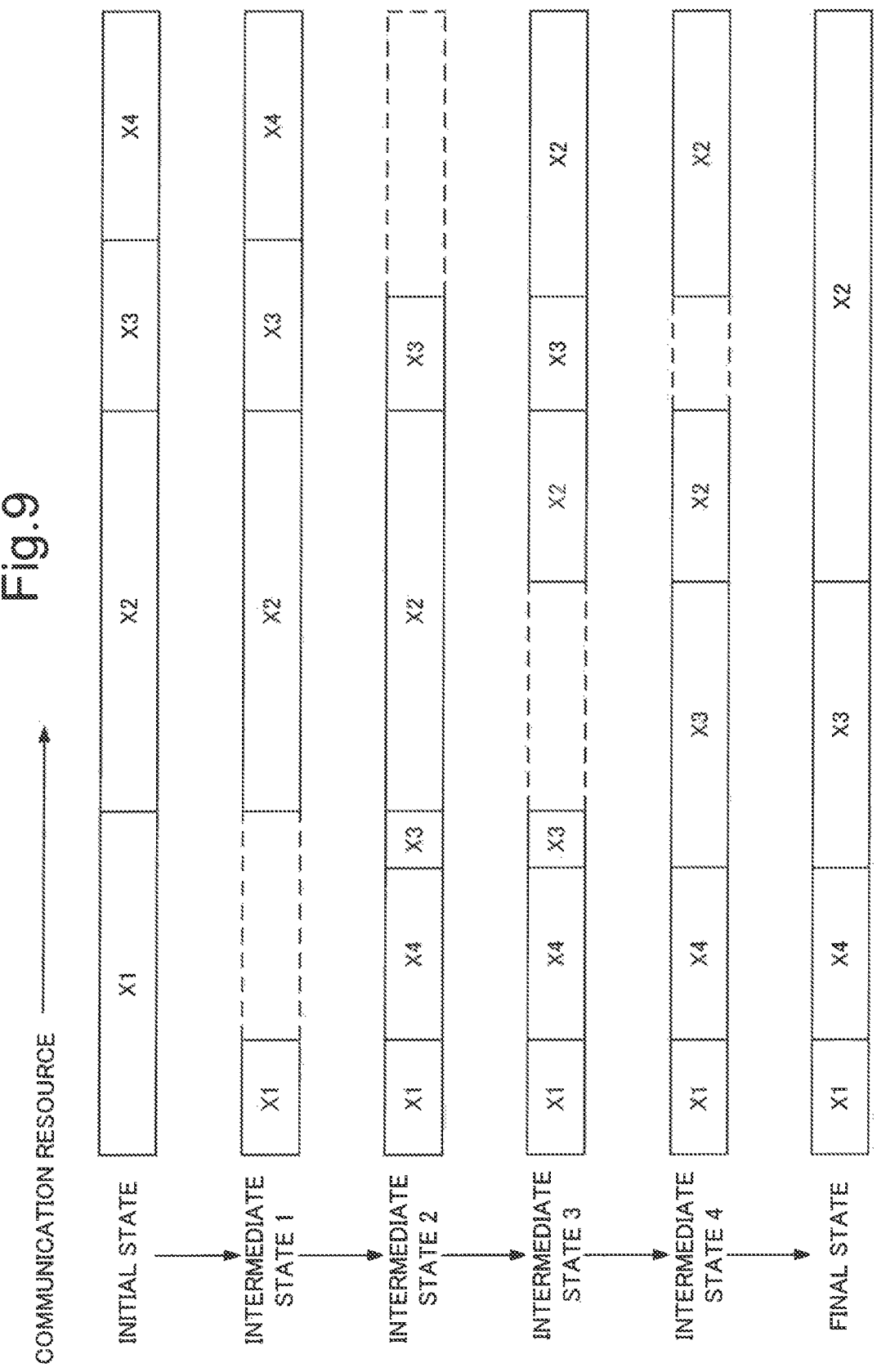
FIG. 9 is a diagram illustrating other examples of intermediate states when the initial state is changed to the final state, the states being illustrated in FIG. 7.

When an allocation value held by the communication resource allocation computation processing unit 36 changes, a generated intermediate state also changes. For example, in the examples illustrated in FIGS. 7 and 8, it is assumed that an allocation value for a communication node X2 is 7. In this case, for example, the communication resource allocation computation processing unit 36 generates intermediate states as illustrated in FIG. 9. Referring to FIGS. 8 and 9, it is understood that while a variation in a number of allocated communication resources to each communication node 2 is smaller in FIG. 9 compared with that in FIG. 8, a number of intermediate states that are passed through increases.

Figure 10:
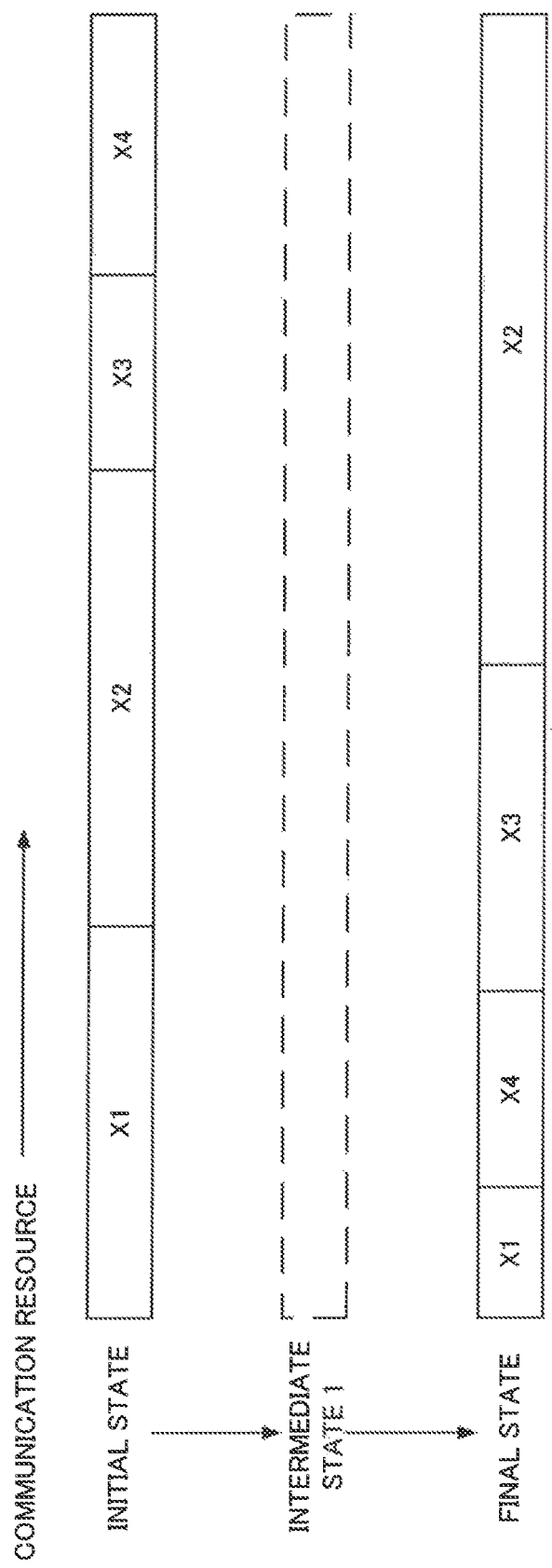
FIG. 10 is a diagram illustrating another example of an intermediate state when the initial state is changed to the final state, the states being illustrated in FIG. 7.

Further, when an allocation value is 0 for each communication node 2, the communication resource allocation computation processing unit 36 generates an intermediate state 1 in which communication resources are not allocated to any communication node 2, as illustrated in FIG. 10. In this case, regardless of states of an initial state and a final state, allocation of communication resources changes in an order of the initial state, the intermediate state 1, and the final state.

Further, a processing example of, when an intermediate state includes a communication resource not allocated to any communication node 2, updating the intermediate state in such a way that the communication resource is allocated to an arbitrary communication node 2 will be described with reference to FIG. 11. FIG. 11 illustrates an example of change in the intermediate states illustrated in FIG. 9 and indicates an example of an arbitrary communication node 2 in parentheses. Referring to FIGS. 9 and 11, communication resources R3 to R6 not allocated to any communication node 2 in FIG. 9 are allocated to an arbitrary communication node 2 (e.g. X4) in an intermediate state 1 in FIG. 11. Thus, the communication resource allocation computation processing unit 36 may be configured to, subsequently to generating an intermediate state, allocate a communication resource not allocated to any communication node 2 in the intermediate state to an arbitrary communication node 2. As illustrated in an intermediate state 3 in FIG. 11, an arbitrary communication node 2 allocated by the communication resource allocation computation processing unit 36 may be different for each communication resource. Further, as illustrated in an intermediate state 4, even when the communication resource allocation computation processing unit 36 configured as described above, a communication resource may not be allocated, when necessary.

A specific configuration and a processing example of the communication resource allocation computation processing unit 36 will be described below with four examples.

A first example is a communication control algorithm operating even on hardware not including a large-scale computation device such as a central processing unit (CPU), by a relatively simple means, and hardware. In the communication control by the simple algorithm, a method of allocating a communication resource is limited.

The simple algorithm being the first example is suitable for use in small-scale but stable communication and communication requiring change in communication resource allocation. For example, the example may be used in control communication (on the controlling side) in a small-sized aerial mobile object.

For example, a communication resource allocation computation processing unit 36A being the first configuration example of the communication resource allocation computation processing unit 36 is configured as illustrated in FIG. 12. Referring to FIG. 12, the communication resource allocation computation processing unit 36A includes a register 361A, a data selection unit 362A, an AND gate 363A, an OR gate 364A, and an update determination unit/OR gate 365A.

The register 361A holds an initial state, a final state, and an intermediate state in computation input from the update determination unit/OR gate 365A.

The data selection unit 362A selects a latest intermediate state from the register 361A and also successively selects (or performs parallel processing on) bit strings input to a logic gate.

The AND gate 363A performs a bit-by-bit AND operation in a Boolean field on a set of data input from the data selection unit 362A.

The OR gate 364A performs an OR operation in a Boolean field on data input from the AND gate 363A, the operation transforming a certain number of values input from the AND gate into one value.

The update determination unit/OR gate 365A performs an OR operation in a Boolean field, the operation transforming a certain number of values input from the OR gate 364A into one value. Further, the update determination unit/OR gate 365A performs processing of, when an OR operation result by the update determination unit/OR gate 365A is 0, updating the value, and when the result is 1, not updating the value.

With the configuration described above, for example, the communication resource allocation computation processing unit 36A performs processing as follows.

For example, it is assumed that communication resource allocation is changed from an initial state to a final state that are illustrated in FIG. 13. Referring to FIG. 13, in the initial state, communication resources R1 and R2 are allocated to a communication node 2 being X1. Further, communication resources R3 and R4 are allocated to a communication node 2 being X2. Further, a communication resource R5 is allocated to a communication node 2 being X3. Further, in the final state, the communication resource R1 is allocated to the communication node 2 being X1, the communication resources R2 and R3 are allocated to the communication node 2 being X2, and the communication resources R4 and R5 are allocated to the communication node 2 being X3.

First, the register 361A stores the aforementioned initial state and the final state.

The data selection unit 362A selects the initial state and the final state. Further, the data selection unit 362A defines a combination of data passing through the AND gate 363A.

FIGS. 14 and 15 illustrate examples of operations in the data selection and the logic gates (the AND gate 363A, the OR gate 364A, and the update determination unit/OR gate 365A). As will be described later, the algorithm replaces a communication resource allocation state of one (or more than one) of the nodes in each step from the initial state to the final state.

As described above, the communication node 2 being X1 is allocated with the communication resources R1 and R2 in the initial state and is allocated with the communication resource R1 in the final state. Further, the communication node 2 being X2 is allocated with the communication resources R3 and R4 in the initial state and is allocated with the communication resources R2 and R3 in the final state.

Further, the communication node 2 being X3 is allocated with R5 in the initial state and is allocated with R4 and R5 in the final state.

The aforementioned states are expressed by matrices as illustrated in FIG. 14. In FIG. 14, each matrix arranges communication nodes 2 column-wise and communication resources row-wise, and when a communication resource in a certain row is allocated to a communication node 2 in a certain column, a matrix element thereof becomes 1. For example, the communication node 2 being X1 is allocated with the communication resources R1 and R2 in the initial state. Accordingly, the above is denoted as (11000). Left-hand processing GP1 in FIG. 14 illustrates an example of determining whether or not to replace the allocation to the communication node 2 being X1 with the final state. Further, middle processing GP2 in FIG. 14 illustrates an example of determining whether or not to replace the allocation to the communication node 2 being X2 with the final state. Further, right-hand processing GP3 in FIG. 14 illustrates an example of determining whether or not to replace the allocation to the communication node 2 being X3 with the final state.

For example, in order to make a determination for the communication node 2 being X1, the data selection unit 362A inputs the first column of a final state GT, and the second and third columns (other than the first column) of an initial state GS bit by bit, respectively, to the AND gate 363A.

The AND gate 363A calculates a logical conjunction, based on the input. Specifically, (10000) AND (00110) and (10000) AND (00001) are calculated. Consequently, (10000) AND (00110)=(00000) and (10000) AND (00001)=(00000) are obtained.

The calculation result in the AND gate 363A is input to the OR gate 364A. The OR gate 364A calculates a logical disjunction, based on the input. Specifically, OR (00000) and OR (00000) are calculated. Consequently, OR (00000)=0 and OR (00000)=0 are obtained.

The calculation result in the OR gate 364A is input to the update determination unit/OR gate 365A. The update determination unit/OR gate 365A calculates a logical disjunction, based on the input. Specifically, OR (00) is calculated. Consequently, OR (00)=0 is obtained.

Since the calculation result is 0, the update determination unit/OR gate 365A determines next communication resource allocation to be the final state, with regard to the communication node 2 being X1.

Similarly, in order to make a determination for the communication node 2 being X2, the data selection unit 362A inputs the second column of the final state GT, and the first and third columns (other than the second column) of the initial state GS bit by bit, respectively, to the AND gate 363A.

In this case, the AND gate 363A calculates (01100) AND (11000)=(01000), (01100) AND (00001)=(00000). Then, the OR gate 364A calculates OR (01000)=1 and OR (00000)=0. Subsequently, the update determination unit/OR gate 365A calculates OR (10)=1.

Since the calculation result is 1, the update determination unit/OR gate 365A determines not to update next communication resource allocation (the initial state), with regard to the communication node 2 being X2.

By similarly performing calculation with respect to X3, (00011) AND (11000)=(00000) and (00011) AND (00110)=(00010) are obtained, then OR (00000)=0 and OR (00010)=1 are obtained, and then OR (01)=1 is obtained. Accordingly, since the calculation result is 1, the update determination unit/OR gate 365A determines not to update next communication resource allocation (the initial state), with regard to the communication node 2 being X3.

Consequently, an intermediate state 1 in which only the allocation state of X1 is updated to the final state is generated. Specifically, the intermediate state 1 becomes a state in which the communication resource R1 is allocated to the communication node 2 being X1, the communication resources R3 and R4 are allocated to the communication node 2 being X2, and the communication resource R5 is allocated to the communication node 2 being X3.

The intermediate state 1 obtained as a result of the calculation described above is held in the register 361A.

Next, as illustrated in FIG. 15, entirely similar operations will be performed between the intermediate state 1 and the final state assuming the intermediate state 1 to be an initial state. Since the communication node 2 being X1 is already in the final state, calculation only needs to be performed for X2 and X3.

As illustrated in FIG. 15, a logical operation is performed with respect to the communication node 2 being X2 by use of the second column of the final state GT, and the first and third columns of the intermediate state 1 assumed to be an initial state GS. Consequently, (01100) AND (10000)= (00000) and (01100) AND (00001)=(00000) are obtained, then OR (00000)=0 and OR (00000)=0 are obtained, and then OR (00)=0 is obtained. Further, a logical operation is performed with respect to the communication node 2 being X3 by use of the third column of the final state GT, and the first and second columns of the intermediate state 1 assumed to be an initial state GS. Consequently, (00011) AND (10000)=(00000) and (00011) AND (00110)=(00010) are obtained, then OR (00000)=0 and OR (00010)=1 are obtained, and then OR (01)=1 is obtained.

Accordingly, as a result of the calculation described above, an intermediate state 2 in which communication resource allocation to X2 is the final state, and communication resource allocation to X3 is the initial state is generated.

By the processing described above, the intermediate state 1 and the intermediate state 2 that are illustrated in FIG. 16 are generated. As described above, in the intermediate state 1, compared with the initial state, a communication resource in the final state is allocated to the communication node 2 being X1. Accordingly, the intermediate state 1 becomes a state in which the communication resource R1 is allocated to the communication node 2 being X1, the communication resources R3 and R4 are allocated to the communication node 2 being X2, and the communication resource R5 is allocated to the communication node 2 being X3. Further, in the intermediate state 2, compared with the intermediate state 1, communication resources in the final state are further allocated to the communication node 2 being X2. Accordingly, the intermediate state 2 becomes a state in which the communication resource R1 is allocated to the communication node 2 being X1, the communication resources R2 and R3 are allocated to the communication node 2 being X2, and the communication resource R5 is allocated to the communication node 2 being X3.

Referring to FIG. 16, it is understood that an intermediate state is generated in such a way that the same communication resource is not allocated to different communication nodes 2 in consecutive allocation states in a time series.

Conditions for applying the communication resource allocation computation processing unit 36A are as follows:
1. When each communication node 2 is expressed to be allocated with only consecutive communication resources in an initial state, the each communication node 2 is also allocated with only consecutive communication resources in a final state;
2. An "order" of respective communication nodes 2 based on allocated communication resources is the same between an initial state and a final state; and
3. A limit on a number of communication resources (allocation value) is greater than or equal to the smaller value of an initial state and a final state for each communication node 2.

The three conditions are compatible with an actually used multiple access system. Allocation of consecutive communication resources enables efficient communication by reducing a communication resource domain not directly available to communication such as a guard time and a guard band. For basic traffic control, an order of respective communication nodes 2 with respect to communication resources is not important, and a number of allocations has only to be controlled. Further, since at least traffic in either of an initial state and a final state is secured, a traffic variation is minimum.

Next, a second configuration example of the communication resource allocation computation processing unit 36 will be described. In the second example, a communication resource allocation control algorithm completing allocation of an arbitrary communication resource in a minimum number of steps by a more general means will be described.

For example, a communication resource allocation computation processing unit 36B being the second configuration example of the communication resource allocation computation processing unit 36 is configured as illustrated in FIG. 17. Referring to FIG. 17, the communication resource allocation computation processing unit 36B includes a register 361B, a computation device 362B, and a memory 363B. The computation device 362B is a central processing unit (CPU) or the like, and executes generation processing of an intermediate state by the CPU executing a program stored in a storage device such as the memory 363B.

The second method writes every possible pattern of communication resource allocation and generates a graph by connecting, by a link, allocation patterns that can be placed in adjoining steps without congestion. When an initial state and a final state are determined, a string of intermediate states connecting the initial state and the final state in a minimum number of steps is obtained by searching the graph for a shortest route.

While any shortest route search algorithm may be used, a search tree method is used for a purpose of description. The search tree method writes every state adjoining an initial state and repeats processing of writing every state adjoining the respective states until a final state is found. When the same state appears in the processing, the state appearing later is discarded. The method expresses connections in a graph as a tree diagram with a certain node as a reference point and hence is called a search tree.

The register 361B holds an initial state, a final state, and an allocation value indicating a number of resources for each communication node 2.

The computation device 362B replaces the logic gate part in the first method. The computation device 362B is configured in a programmable manner, and is, for example, a CPU or a field programmable gate array (FPGA).

The memory 363B is able to save a graph structure. When a number of communication resources, a number of communication nodes 2, and an allocation value for each communication node 2 are predetermined, a calculation time for generating an intermediate state can be greatly shortened by saving a graph structure. The memory 363B is not necessarily an essential configuration. Accordingly, the communication resource allocation computation processing unit 36B may not include the memory 363B.

For example, with the configuration described above, the communication resource allocation computation processing unit 36B executing the second method performs processing as follows.

For example, it is assumed that communication resource allocation is changed from an initial state LS to a final state LT that are illustrated in FIG. 18. Referring to FIG. 18, in the initial state LS, a communication resource R1 is allocated to a communication node 2 being X1. Further, communication resources R2 and R3 are allocated to a communication node 2 being X2. Further, in the final state LT, the communication resource R1 is allocated to the communication node 2 being X2. Further, the communication resource R2 is allocated to the communication node 2 being X1. Further, the communication resource R3 is not allocated to a communication node 2.

When the register 361B determines the initial state LS, the computation device 362B generates a tree graph by successively generating states adjoining the initial state LS without congestion, as illustrated in FIG. 19. Alternatively, the computation device 362B refers to the memory 363B and reads a graph structure from the memory 363B. Then, at a stage when the computation device 362B generates the final state LT during generation of the graph or retrieves the final state LT from the memory 363B, the computation device 362B follows links to the initial state LS. Consequently, the computation device 362B determines states between the initial state LS and the final state LT as intermediate states.

Referring to FIG. 19, in the case illustrated in FIG. 18, the computation device 362B generates an intermediate state LM1 and an intermediate state LM2. The intermediate state LM1 is a state in which the communication resource R1 is allocated to the communication node 2 being X1, the communication resource R2 is not allocated to a communication node 2, and the communication resource R3 is allocated to the communication node 2 being X2. Further, the intermediate state LM2 is a state in which the communication resource R1 is not allocated to a communication node 2, the communication resource R2 is allocated to the communication node 2 being X1, and the communication resource R3 is allocated to the communication node 2 being X2.

Referring to FIG. 19, it is understood that an intermediate state is generated in such a way that the same communication resource is not allocated to different communication nodes 2 in consecutive allocation states in a time series.

Unlike the first method, the aforementioned second method does not have an applicable condition. The second method is able to generate an intermediate state reaching a final state in a minimum number of steps with respect to an arbitrary initial state, an arbitrary final state, and an arbitrary allocation value for each node.

The example described above exemplifies a case of the computation device 362B generating a graph starting from an initial state. However, the computation device 362B may be configured to generate a graph starting from a final state and search for an initial state.

Next, a third configuration example of the communication resource allocation computation processing unit 36 will be described. In the third example, a method of determining a communication resource allocation route with a smaller operation amount, in order to achieve the same goal as the method described in the second example, will be described. The third method is effective when a number of communication resources or a number of communication nodes 2 is large. Specifically, a method of minimizing an entire route length by mutually rearranging a plurality of data strings with different lengths will be presented as the third method.

The third configuration example of the communication resource allocation computation processing unit 36 is the same as the communication resource allocation computation processing unit 36B being the second configuration example. The third configuration example differs only in an algorithm executed by the computation device 362B.

As illustrated in FIG. 20, it is assumed that an initial state and a final state form a directed bipartite graph in the third method. Then, a plurality of paths including every link in the bipartite graph as a whole are arbitrarily configured with a communication node 2 exceeding an allocation value for each communication node 2 in the initial state and a communication resource not allocated to any communication node 2 in the initial state as "left endpoints" and a communication node 2 exceeding the allocation value for each communication node 2 in the final state and a communication resource not allocated to any communication node 2 in the final state as "right endpoints" (see FIG. 21). In FIG. 20, a communication node 2 that can be positioned at the aforementioned left endpoint or right endpoint is denoted as a degree of freedom 1. In the case of FIG. 20, for example, paths with communication nodes 2 being X1 and X3 as left endpoints and communication nodes 2 being X4 and X6 as right endpoints are configured, as illustrated in FIG. 21.

By mainly executing a "rearrangement" operation on the paths, the computation device 362B generates a combination of paths minimizing a length of a path with a maximum length. Then, the computation device 362B generates an intermediate state from the combination of the paths. When a communication resource not allocated to any node in an initial state or a final state exists, it is assumed that the computation device 362B generates a path in such a way that an endpoint of the path is the unallocated communication resource itself rather than a communication node 2.

For example, the communication resource allocation computation processing unit 36B executing the third method performs processing as follows.

For example, it is assumed that communication resource allocation is changed from an initial state to a final state that are illustrated in FIG. 20. Referring to FIG. 20, in the initial state, communication resources MR1 and MR2 are allocated to a communication node 2 being MX1, and a communication resource MR3 is allocated to a communication node 2 being MX2. Further, communication resources MR4 and MR5 are allocated to a communication node 2 being MX3, and a communication resource MR6 is allocated to a communication node 2 being MX4. Further, a communication resource MR7 is allocated to a communication node 2 being MX5, and a communication resource MR8 is allocated to a communication node 2 being MX6. Further, in the final state, the communication resource MR1 is allocated to the communication node 2 being MX1, and the communication resource MR2 is allocated to the communication node 2 being MX2. Further, the communication resource MR3 is allocated to the communication node 2 being MX3, and the communication resources MR4 and MR5 are allocated to the communication node 2 being MX4. Further, the communication resource MR6 is allocated to the communication node 2 being MX5, and the communication resources MR7 and MR8 are allocated to the communication node 2 being MX6.

The register 361B holds the initial state and the final state as described above. This is equivalent to holding the bipartite graph illustrated in FIG. 20.

For example, the bipartite graph is generated by the computation device 362B from the initial state and the final state that are held by the register 361B as follows. As described above, FIG. 20 illustrates a case that a number of communication resources is eight, and a number of communication nodes 2 is six. Further, it is assumed that every allocation value for each communication node 2 is one.

As illustrated in FIG. 20, the computation device 362B arranges the communication resources MR1 to MR8 as elements of the bipartite graph on one side. Further, the computation device 362B arranges the communication nodes 2 being MX1 to MX6 as elements on the other side. Then, the computation device 362B makes a directed link from each communication node 2 to a communication resource allocated to the communication node 2 in the initial state. In the case illustrated in FIG. 20, data representing a total of eight links, from MX1 to MR1, from MX1 to MR2, from MX2 to MR3, from MX3 to MR4, from MX3 to MR5, from MX4 to MR6, from MX5 to MR7, and from MX6 to MR8, are held. For example, in the computation device 362B, the links may be held as 8×6 data with existence of a link being denoted as 1 and nonexistence as 0, or communication resources allocated for respective links may be held in a nested structure (assuming an internal register).

Next, in the final state, the computation device 362B makes a link in a direction reverse to the direction in the initial state from each communication node 2 to a communication resource allocated to the communication node 2. In the case illustrated in FIG. 20, data representing a total of eight links, from MR1 to MX1, from MR2 to MX2, from MR3 to MX3, from MR4 to MX4, from MR5 to MX4, from MR6 to MX5, from MR7 to MX6, and from MR8 to MX6, are held. The computation device 362B also holds the links in the final state in a form similar to the initial state.

Next, the computation device 362B generates a "path" (or a "sequence") from the bipartite graph. The path generation processing by the computation device 362B will be described citing three specific examples including one already being described.

First, processing in a case of the register 361B holding the initial state and the final state that are illustrated in FIG. 20 will be described.

The computation device 362B generates a plurality of paths exceeding a number determined from an allocation value, from the bipartite graph generated above. As described above, in the case of FIG. 20, an allocation value for each communication node 2 is 1, and a total for all the communication nodes 2 is 6. Accordingly, a number of paths with an endpoint becomes two (8-6).

For example, as illustrated in FIG. 21, the computation device 362B generates MX1, MR2, MX2, MR3, MX3, MR4, MX4, MR6, MX5, MR7, MX6 as a first path (sequence 1). Further, the computation device 362B generates MX3, MR5, MX4 as a second path (sequence 2).

Note that the computation device 362B may generate the aforementioned paths by any method. For example, the computation device 362B generates a path by following a directed link one by one from an endpoint. When a path is generated from a bipartite graph, a cycle without an endpoint may be generated. In this case, a method to be described later allows for connection to a path with an endpoint.

The computation device 362B writes a plurality of generated path candidates into the register 361B. For example, the computation device 362B writes the sequence 1 and the sequence 2 that are illustrated in FIG. 21 into the register 361B.

Next, when the same communication node 2 exists in the plurality of generated paths (sequences), the computation device 362B attempts "rearrangement" of the paths (sequences) before and after the communication node 2.

In the case illustrated in FIG. 21, the sequence 1 and the sequence 2 have the communication nodes 2 being MX3 and MX4 as common nodes (the same communication nodes 2). Accordingly, for example, the computation device 362B executes rearrangement at positions of the communication node being MX3 in the sequence 1 and the sequence 2. Specifically, connections of the two sequences are exchanged at MX3. Consequently, MX1, MR2, MX2, MR3, MX3, MR5, MX4 is generated as a sequence 1A rearranged from the sequence 1. Further, MX3, MR4, MX4, MR6, MX5, MR7, MX6 is generated as a sequence 2A rearranged from the sequence 2.

By thus performing rearrangement, a difference between a maximum value and a minimum value of sequence lengths decreases when a communication node 2 is considered as a node. The computation device 362B rearranges sequences in such a way as to minimize a difference between a maximum value and a minimum value of sequence lengths. When a difference between a maximum value and a minimum value of sequence lengths becomes 2 or less, and is not shortened by any rearrangement, the respective sequences related to the small difference provide a shortest step when an intermediate state is generated.

In other words, a number of intermediate states between an initial state and a final state is equal to a length of a maximum sequence, and therefore a number of generated intermediate states can be minimized by performing rearrangement as described above. In the case illustrated in FIG. 21, the length of the sequence 1 is 6, and the length of the sequence 2 is 2. On the other hand, the length of the sequence 1A is 4, and the length of the sequence 2A is 4. Accordingly, an intermediate state string related to the sequence 1A and the sequence 2A provides a communication resource allocation schedule in a minimum number of steps.

Three intermediate states (an intermediate state 1, an intermediate state 2, and an intermediate state 3) as illustrated in FIG. 22 may be generated from the rearranged sequences 1A and 2A.

Specifically, the computation device 362B generates the aforementioned intermediate states by performing parallel processing from the left endpoints with respect to the sequence 1A and the sequence 2A that are illustrated in FIG. 21. The computation device 362B performs the aforementioned processing by determining an intermediate state for each communication resource. Further, when an arrow is extended from a communication resource (represented by a circle) to a communication node 2 (represented by a rectangle) in FIG. 21, the computation device 362B performs processing of adding the communication resource to the communication node 2. Further, when an arrow extends from a communication node 2 to a communication resource in FIG. 21, the computation device 362B performs processing of deleting the communication resource from the communication node 2.

For example, in the case illustrated in FIG. 21, an arrow extends from the communication node 2 being MX1 to the communication resource MR2. Further, an arrow extends from the communication node 2 being MX3 to the communication resource MR4. Accordingly, the computation device 362B deletes allocation of MR2 to MX1 and also deletes allocation of MR4 to MX3. Consequently, the computation device 362B generates the intermediate state 1 illustrated in FIG. 22.

Next, in the case illustrated in FIG. 21, an arrow extends from the communication resource MR2 to the communication node 2 being MX2, and also an arrow extends from the communication node 2 being MX2 to the communication resource MR3. Further, an arrow extends from the communication resource MR4 to the communication node 2 being MX4, and also an arrow extends from the communication node 2 being MX4 to the communication resource MR6. Accordingly, the computation device 362B allocates MR2 to MX2, and also deletes allocation of MR3 to MX2. Further, the computation device 362B allocates MR4 to MX4 and also deletes allocation of MR6 to MX4. Consequently, the computation device 362B generates the intermediate state 2 illustrated in FIG. 22.

Next, in the case illustrated in FIG. 21, an arrow extends from the communication resource MR3 to the communication node 2 being MX3, and also an arrow extends from the communication node 2 being MX3 to the communication resource MR5. Further, an arrow extends from the communication resource MR6 to the communication node 2 being MX5, and also an arrow extends from the communication node 2 being MX5 to the communication resource MR7. Accordingly, the computation device 362B allocates MR3 to MX3 and also deletes allocation of MR5 to MX3. Further, the computation device 362B allocates MR6 to MX5 and also deletes allocation of MR7 to MX5. Consequently, the computation device 362B generates the intermediate state 3 illustrated in FIG. 22.

Finally, in the case illustrated in FIG. 21, an arrow extends from the communication resource MR5 to the communication node 2 being MX4, and also an arrow extends from the communication resource MR7 to the communication node 2 being MX6. Accordingly, the computation device 362B allocates MR5 to MX4 and also allocates MR7 to MX6. Consequently, the state becomes identical to the final state, and the processing is completed.

When a shortest step (or a permissibly short step if not shortest) is thus configured only by rearrangement, an average resource usage rate is maximum.

Next, a case of changing communication resource allocation from an initial state to a final state that are illustrated in FIG. 23 will be described. In the case illustrated in FIG. 23, when every allocation value for each communication node 2 is 1, a joined link including a communication node 2 being NX2 and a communication node 2 being NX3 never has an endpoint. Accordingly, for example, a sequence 1 becomes a cycle NX2, NR3, NX3, NR4, NX2 as illustrated in FIG. 24.

Further, in the case illustrated in FIG. 23, there exists a path on which a communication node 2 being NX1 moves to and immediately returns from a communication resource (NR1 or NR2) allocated in the initial state and the final state in common. For example, in the case illustrated in FIG. 23, NX1, NR1, NX1 and NX1, NR2, NX1 are possible paths as described above. When every resource is equivalent, the computation device 362B may select either of the aforementioned paths by any method. For example, the computation device 362B may select either of the aforementioned paths in such a way that resources used by nodes in an intermediate state are as consecutive as possible. In the case illustrated in FIG. 23, for example, it is assumed that the computation device 362B selects NX1, NR2, NX1 as a sequence 2 as illustrated in FIG. 24.

The computation device 362B may add to a path with an endpoint a bidirectional link from any communication resource on the path to an arbitrary communication node 2 that does not need to exist on the path. In the case illustrated in FIG. 24, the computation device 362B refers to a cycle NX2, NR3, NX3, NR4, NX2 being the sequence 1 and adds NR2, NX2, NR2 being a bidirectional link to a communication node 2 in the cycle to NX1, NR2, NX1 being the sequence 2. In other words, the computation device 362B generates an extended equivalent sequence 2 illustrated in FIG. 24. Developing the extended equivalent sequence 2 generated by the computation device 362B on the basis of an endpoint yields NX1, NR2, NX2, NR2, NX1.

Subsequently, the computation device 362B performs rearrangement between the generated sequences (the sequence 1 and the extended equivalent sequence 2). Consequently, for example, the computation device 362B generates a sequence NX1, NR2, NX2, NR3, NX3, NR4, NX2, NR2, NX1 as illustrated in FIG. 24. Then, the computation device 362B generates four intermediate states (an intermediate state 1, an intermediate state 2, an intermediate state 3, and an intermediate state 4) as illustrated in FIG. 25 from the generated sequence.

Thus, there is a case that an unavoidable cycle exists in a bipartite graph itself. Such a case may be supported by adding to a path with an endpoint a bidirectional link from any communication resource on the path to an arbitrary communication node 2 that does not need to exist on the path. Aside from the case described above that an unavoidable cycle exists in a bipartite graph itself, when directed links in a bipartite graph are joined as a preparation for the aforementioned "rearrangement" processing, it may be considered that several cycles without an endpoint may remain, depending on the processing method by the computation device 362B. However, a cycle originating in the processing method may be cleared solely by "rearrangement" (extension not required).

Finally, a case of changing communication resource allocation from an initial state to a final state that are illustrated in FIG. 26 will be described. In the case illustrated in FIG. 26, processing of extending a sequence in order to acquire a shorter intermediate state string (less number of steps), even when the sequence does not include a cycle or when a cycle is cleared, will be described. When a difference between a maximum value and a minimum value of sequence lengths of a plurality of sequences is 3 or more, the computation device 362B may acquire a shorter (or equal-length) intermediate state string by performing the following processing.

In the initial state and the final state that are illustrated in FIG. 26, for example, when simply following directed links in a bipartite graph, the computation device 362B may generate two sequences as illustrated in FIG. 27. Specifically, the computation device 362B may generate OX1, OR2, OX2, OR3, OX3, OR4, OX4, OR5, OX5 being a sequence 1 and OX6, OR8, OX7 being a sequence 2. In this case, a communication node 2 common to the two sequences does not exist, and therefore simple sequence rearrangement cannot be performed.

On the other hand, in the case illustrated in FIG. 27, the sequence length of the sequence 1 is 5, and the sequence length of the sequence 2 is 2. Accordingly, the difference becomes 3. Then, the computation device 362B generates an extended equivalent sequence 2 as illustrated in FIG. 27. Specifically, the computation device 362B adds to the sequence 2 being a path with an endpoint a bidirectional link from a communication resource OR8 to an arbitrary communication node 2 being OX3. Developing the aforementioned extended equivalent sequence 2 on the basis of the endpoint yields OX6, OR8, OX3, OR8, OX7. Consequently, the communication node 2 being OX3 becomes common to the sequence 1 and the aforementioned extended equivalent sequence 2. Then, the computation device 362B attempts path (sequence) "rearrangement" before and after the same communication node 2 being OX3.

Consequently, as illustrated in FIG. 27, the computation device 362B generates OX1, OR2, OX2, OR3, OX3, OR8, OX7 as a sequence 1A. Further, the computation device 362B generates OX6, OR8, OX3, OR4, OX4, OR5, OX5 as a sequence 2A. Then, the computation device 362B generates three intermediate states as illustrated in FIG. 28, based on the generated sequence 1A and sequence 2A.

As illustrated in FIG. 27, the sequence length of the sequence 1A after execution of the rearrangement is 4, and the sequence length of the sequence 2A is 4. Since the sequence length of the sequence 1 before the rearrangement is 5, it is understood that a number of generated intermediate states can be reduced by execution of the rearrangement.

When reducing a number of generated intermediate states by thus performing extension and rearrangement, in order to enable shortening by rearrangement, a common node (OX3 in the case of FIG. 27) in an extended sequence shall appear on the left-hand side of the common node in a sequence being a rearrangement destination. Specifically, a node common to another sequence, the node being generated by extension in an originally short-length sequence, can appear only in the second step (the first step when a sequence endpoint is a communication resource instead of a communication node 2) or later, and therefore a sequence being a rearrangement destination shall include the common node in the third step or later. Accordingly, extension and rearrangement cannot be applied unless a length of the longest sequence is 3 or more, to begin with. Further, since a total sequence length increases by extension, when a sequence 1 with a length L and a sequence 2 with a length L+1 are extended and rearranged, the length of the sequence 1A becomes L+m+1, and the length of the sequence 2A becomes L+n, where m+n=1. From the above, it is understood that unless a difference between a maximum value and a minimum value of sequence lengths is 3 or more, the method does not contribute to reduction in a number of steps.

As described above, in the third method, the computation device 362B generates an intermediate state as follows:
Generate a bipartite graph from an initial state and a final state;
Generate sequences, based on the bipartite graph; and
Generate an intermediate state from the sequences.
Further, the computation device 362B,
when the same communication node 2 exists in a plurality of sequences, performs rearrangement of sequences in such a way as to minimize a difference between a maximum value and a minimum value of sequence lengths;
when a cycle exists, adds a bidirectional link; and
when a difference between a maximum value and a minimum value of sequence lengths is 3 or more, shortens the sequence length by adding a bidirectional link.

Finally, a fourth configuration example of the communication resource allocation computation processing unit will be described. The fourth example is related to probabilistic control and is a most practical communication resource control means enabling efficient parameter selection suited to a purpose. The method is also a generalized communication resource allocation method including a local station (a base station itself).

As illustrated in FIG. 29, a communication resource allocation computation processing unit 36C being the fourth configuration example of the communication resource allocation computation processing unit 36 is used in a situation in which communication reliability between a communication node 2 performing resource allocation and another communication node 2 is defined. As illustrated in FIG. 29, for example, when a communication distance increases, received power at a communication node 2 decreases, and reliability decreases (a value indicated by reliability information decreases). The reliability information may be thus defined by received power or may be defined by an error rate or a signal detection rate in actual data transmission and reception. For example, it is assumed below that the reliability information is defined by a signal detection rate. Signal detection is generally performed at the modulator-demodulator 31 before modulation-demodulation. Consequently, by defining the reliability by the signal detection rate, an extra configuration such as a configuration for received power measurement does not need to be included.

FIG. 30 is a configuration example of the communication resource allocation computation processing unit 36C. Referring to FIG. 30, the communication resource allocation computation processing unit 36C includes a data division unit 361C, a communication resource allocation computation processing unit (36A or 36B) 362C, and a data integration unit 363C. The communication resource allocation computation processing unit (36A or 36B) 362C is the communication resource allocation computation processing unit 36A illustrated in FIG. 12 or the communication resource allocation computation processing unit 36B illustrated in FIG. 17. In other words, the communication resource allocation computation processing unit 36C includes the configuration of the communication resource allocation computation processing unit 36A or the communication resource allocation computation processing unit 36B.

The data division unit 361C adds a random variable to each communication node 2 (or each communication resource), based on communication reliability value for each communication node 2. Then, the data division unit 361C determines whether or not to permit an overlap in consecutive allocation states in a time series, based on the added random variable. In other words, the data division unit 361C determines whether to move from an initial state to a final state in one step or insert an intermediate state without congestion between the states.

Thus, the data division unit 361C divides entire communication nodes 2 and communication resources into communication nodes 2 and communication resources as a part without insertion of an intermediate state, and communication nodes 2 and communication resources as a part with insertion of an intermediate state. Then, the data division unit 361C outputs only the communication nodes 2 and the communication resources as the part with insertion of an intermediate state to the communication resource allocation computation processing unit (36A or 36B) 362C.

Specifically, for example, data division unit 361C compares reliability information (signal detection rate) with a predetermined threshold value. Then, based on the comparison result, a value of 1 or 0 is assigned as a determination value. For example, the data division unit 361C assigns a determination value 1 to a communication node 2 for which a value indicating reliability information is less than a threshold value and assigns a determination value 0 to a communication node 2 for which a value indicating reliability information is greater than or equal to the threshold value. Then, the data division unit 361C outputs a communication node 2 assigned with a determination value 1 and a communication resource allocated to the communication node 2 assigned with a determination value 1 in an initial state and not allocated in a final state, to the communication resource allocation computation processing unit (36A or 36B) 362C. Alternatively, the data division unit 361C outputs a communication resource associated in the initial state and the final state with a communication node 2 to which a communication resource allocated to a communication node 2 assigned with a determination value 1 in the initial state is allocated in the final state, to the communication resource allocation computation processing unit (36A or 36B) 362C.

The communication resource allocation computation processing unit (36A or 36B) 362C has a configuration similar to that of the communication resource allocation computation processing unit 36A or the communication resource allocation computation processing unit 36B. The communication resource allocation computation processing unit (36A or 36B) 362C performs processing similar to that in the communication resource allocation computation processing unit 36A or the communication resource allocation computation processing unit 36B.

The data integration unit 363C moves a communication node 2 and a communication resource that are not output to the communication resource allocation computation processing unit (36A or 36B) 362C by the data division unit 361C to the final state in one step (at a timing of an intermediate state 1) and couples the node and the resource with the intermediate state and the final state that are output from the communication resource allocation computation processing unit (36A or 36B) 36C2.

With the configuration described above, for example, the communication resource allocation computation processing unit 36C performs processing as described below.

For example, it is assumed that communication resource allocation is changed from an initial state to a final state that are illustrated in FIG. 31. Referring to FIG. 31, in the initial state, a communication resource R1 is allocated to a communication node 2 being X1. Further, communication resources R2 and R3 are allocated to a communication node 2 being X2. Further, communication resources R4 and R5 are allocated to a communication node 2 being X3. Further, a communication resource R6 is allocated to a communication node 2 being X4. Further, in the final state, the communication resources R1 and R2 are allocated to the communication node 2 being X2. Further, the communication resource R3 is allocated to the communication node 2 being X1. Further, the communication resource R4 is allocated to the communication node 2 being X3. Further, the communication resources R5 and R6 are allocated to the communication node 2 being X4.

For example, the data division unit 361C assigns a determination value 0 to the communication nodes 2 being X1, X2, and X4, and a determination value 1 to the communication node 2 being X3, based on input reliability information. Then, the data division unit 361C outputs only the communication resources R4, R5, and R6 associated in the initial state and the final state with the communication nodes 2 (X3, X4) to which the communication resources R4 and R5 allocated in the initial state to the communication node 2 (X3) assigned with a determination value 1 are allocated in the final state, to the communication resource allocation computation processing unit (36A or 36B) 362C.

The communication resource allocation computation processing unit (36A or 36B) 362C performs communication resource allocation computation processing on an output target. In this case, the communication resource allocation computation processing unit (36A or 36B) 362C generates an intermediate state 1 being a state in which R4 is allocated to X3, and R6 is allocated to X4 from a partial initial state being a state in which R4 and R5 are allocated to X3, and R6 is allocated to X4, as illustrated in FIG. 31. The communication resource allocation computation processing unit (36A or 36B) 362C outputs the generated partial state string to the data integration unit 363C.

The data integration unit 363C adds communication resource allocation for X1 and X2 in the final state as-is to a state string for each step input from the communication resource allocation computation processing unit (36A or 36B) 362C in the intermediate state 1 and later. Specifically, in the intermediate state 1, R3 is allocated to X1, and R1 and R2 are allocated to X2. Further, R4 is allocated to X3, and R5 and R6 are allocated to X4. Consequently, the state becomes as illustrated in FIG. 31.

The above is the description of the configuration example of the allocation control communication node 3. Next, an operation example of the allocation control communication node 3 will be described with reference to FIG. 32.

Referring to FIG. 32, the allocation control communication node 3 receives information indicating a final state output by the control application 37 (Step S101). Then, the communication resource allocation computation processing unit 36 generates between an initial state and the final state a plurality of intermediate states in which congestion cannot occur between consecutive states (Step S102).

The control memory/step counter 38 sequences and saves the generated intermediate states, the initial state, and the final state (Step S103). At the first stage, a step counter has an initial value, and communication resource allocation in the initial state is written into the control register 39.

The control memory/step counter 38 increments the counter and writes the intermediate state 1 being a state succeeding the initial state into the control register 39. Then, the transmission switch 33 is turned on in a time domain for transmission by the allocation control communication node 3, transforms allocation information to a communication node 2 along with user data into a signal waveform in the modulator-demodulator 31, and transmits the waveform (Step S104).

The communication node 2 receives the allocation information and the user data. Then, the communication node separates the allocation information and writes the information into the controlled register 22. At this time, it is sufficient for the communication node 2 to write only time domain information allocated to the local node into the controlled register 22. Subsequently, the communication node turns on the transmission switch 23 by use of a communication resource (in a time domain) allocated to each communication node 2 and transmits the user data.

The allocation control communication node 3 monitors in the communication monitoring unit 35 a communication resource used for transmission by a communication node 2 (Step S105). As a result of monitoring by the communication monitoring unit 35, when every actually transmitted time domain matches communication resource allocation notified the previous time, the allocation being stored in the control register 39 or the like (Yes in Step S106), the allocation control communication node 3 determines whether or not the communication resource allocation is the final state (Step S107).

When the allocation is the final state (Yes in Step S107), the allocation control communication node 3 ends the communication resource allocation processing. On the other hand, when the allocation is not the final state (No in Step S107), the control memory/step counter 38 increments the counter, writes communication resource allocation in an intermediate state 2 being a next state into the control register 39, and transmits the allocation information to each communication node 2 (Step S104).

As a result of monitoring by the communication monitoring unit 35, when an actually transmitted time domain does not match a communication resource allocation notified the previous time (No in Step S106), the communication monitoring unit 35 instructs the communication resource allocation computation processing unit 36 to generate an intermediate state again, assuming the actually transmitted time domain as a new initial state. Consequently, the communication resource allocation computation processing unit 36 generates between the new initial state and the final state a plurality of intermediate states in which congestion cannot occur between consecutive states (Step S102). In other words, the communication resource allocation computation processing unit 36 generates intermediate states, based on a monitoring result by the communication monitoring unit 35.

The above is the operation example of the allocation control communication node 3.

Furthermore, as a result of monitoring by the communication monitoring unit 35, when an actually transmitted time domain does not match communication resource allocation notified the previous time, allocation information indicating the same communication resource allocation as the previous time may be transmitted without incrementing the counter in the control memory/step counter 38 as a less efficient but simpler method.

Further, for example, in a case that the control application 37 urgently updates the final state or the like, a latest time domain actually transmitted by the communication node 2 may be assumed as an initial state, and the operation may be performed again by the communication resource allocation computation processing unit 36. In other words, an initial state and a final state are always updatable.

As described above, the allocation control communication node 3 in the communication system 1 according to the present example embodiment includes the communication resource allocation computation processing unit 36. With such a configuration, when changing communication resource allocation to a communication node 2 from an initial state to a final state, the allocation control communication node 3 is able to generate at least one intermediate state in such a way that the change does not cause a congestion state. Further, the allocation control communication node 3 is able to change communication resource allocation to each communication node 2 in such a way that the initial state changes to the final state via the intermediate state. Consequently, when communication resource allocation is changed from an initial state to a final state, a possibility of occurrence of congestion can be reduced, and a possibility of sharp decrease in a communication rate can be reduced.

Further, by being combined with an error detection code and an error correction code, particularly with an error detection code, the method described in the present example embodiment is able to further improve reliability by suppressing a decoding error itself originating in transmission line noise and bringing an actual congestion probability closer and closer to zero. Specifically, when an error is detected in information about a communication resource allocated to a communication node 2, the information is not used in a next transmission, and a communication resource allocated in the previous transmission is reused as-is and transmitted. In other words, processing equivalent to that in a case that allocation information is not received may be performed.

When the method described in the present example embodiment is not used, it is difficult to suppress congestion simply by a code. On the other hand, the method described in the present example embodiment generates an intermediate state in such a way that the same communication resource is not allocated to different communication nodes 2 in consecutive allocation states in a time series. Accordingly, by performing the method described above, a congestion probability is theoretically minimized, and allocation control of a communication resource may be performed while suppressing a congestion probability, with respect to a communicator in unstable control communication. Additionally, a communication node 2 under communication resource allocation control has only to use a communication resource in accordance with received allocation information and does not need to return control information for authentication, or the like.

Further, when the fourth method using the communication resource allocation computation processing unit 36C is employed out of the methods described in the present example embodiment, an allocation change speed may be increased while permitting a certain level of congestion probability.

Further, the present example embodiment guarantees a number of communication resources allocated to each communication node 2 in an intermediate state as an allocation value. Accordingly, even while changing communication resource allocation, traffic variation can be suppressed, and desired traffic can be always maintained.

For example, use of the methods described in the present example embodiment in control communication for an unmanned aircraft, control communication for a robot, control communication for medical equipment, communication control communication, cipher control communication, another type of control communication, long-distance communication (unstable communication), and transfer (replacement) of supplies may be considered.

Second Example Embodiment

Next, a second example embodiment will be described with reference to FIG. 33. An outline of a configuration of a communication control device 4 according to the second example embodiment will be described.

Figure 33:
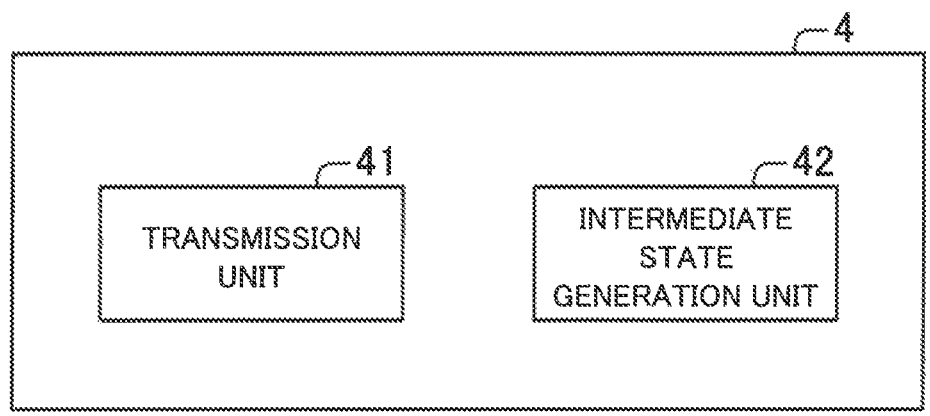
FIG. 33 is a schematic block diagram illustrating a configuration example of a communication control device according to a second example embodiment of the present invention.

Referring to FIG. 33, the communication control device 4 according to the present example embodiment includes a transmission unit 41 and an intermediate state generation unit 42.

When changing communication resource allocation to each communication device from a first allocation state to a second allocation state, the intermediate state generation unit 42 generates an intermediate state indicating communication resource allocation, based on the first allocation state and the second allocation state.

To each of a plurality of communication devices performing communication by use of a previously allocated communication resource, the transmission unit 41 transmits allocation information indicating communication resource allocation used when the communication device performs communication. Transmission unit 41 transmits the allocation information to each communication device in such a way that the first allocation state changes to the second allocation state via an intermediate state generated by the intermediate state generation unit 42.

Thus, the communication control device 4 according to the present example embodiment includes the transmission unit 41 and the intermediate state generation unit 42. With such a configuration, when changing communication resource allocation to each communication device from the first allocation state to the second allocation state, the intermediate state generation unit 42 is able to generate an intermediate state indicating communication resource allocation, based on the first allocation state and the second allocation state. Consequently, the transmission unit 41 is able to transmit the allocation information to each communication device in such a way that the first allocation state changes to the second allocation state via the intermediate state. Consequently, a possibility of congestion caused by the first allocation state changing to the second allocation state at once can be reduced.

The aforementioned communication control device 4 may be provided by a predetermined program being incorporated into the communication control device 4. Specifically, the program being another embodiment of the present invention is a program causing a communication control device to provide: a transmission unit transmitting, to each of a plurality of communication devices performing communication by use of a previously allocated communication resource, allocation information indicating communication resource allocation used by the communication device when performing communication; and an intermediate state generation unit generating, when changing communication resource allocation to each of the communication devices from a first allocation state to a second allocation state, an intermediate state indicating communication resource allocation, based on the first allocation state and the second allocation state, wherein the transmission unit transmits allocation information to each of the communication devices in such a way that the first allocation state changes to the second allocation state via an intermediate state generated by the intermediate state generation unit.

Further, an information control method executed by operation of the aforementioned communication control device 4 is a method including: transmitting, to each of a plurality of communication devices performing communication by use of a previously allocated communication resource, allocation information indicating communication resource allocation used by the communication device when performing communication; when changing communication resource allocation to each of the communication devices from a first allocation state to a second allocation state, generating an intermediate state indicating communication resource allocation, based on the first allocation state and the second allocation state; and transmitting allocation information to each of the communication devices in such a way that the first allocation state changes to the second allocation state via an intermediate state.

The invention of the program or the communication control method including the aforementioned configuration also provides a function similar to the aforementioned communication control device 4 and therefore is able to achieve the aforementioned object of the present invention.

Supplementary Notes

The aforementioned example embodiments may also be described in part or in whole as the following Supplementary Notes. An outline of the communication control device and the like according to the present invention will be described below. However, the present invention is not limited to the following configurations.

Supplementary Note 1

A communication control device including: a transmission unit transmitting, to each of a plurality of communication devices performing communication by use of a previously allocated communication resource, allocation information indicating allocation of the communication resource used by the communication device when performing communication; and an intermediate state generation unit generating, when changing allocation of the communication resource to each of the communication devices from a first allocation state to a second allocation state, an intermediate state indicating allocation of the communication resource, based on the first allocation state and the second allocation state, wherein the transmission unit transmits the allocation information to each of the communication devices in such a way that the first allocation state changes to the second allocation state via an intermediate state generated by the intermediate state generation unit.

Supplementary Note 2

The communication control device according to Supplementary Note 1, wherein, when changing allocation of the communication resource to each of the communication devices from a preceding allocation state, the intermediate state generation unit generates the intermediate state changed from the preceding allocation state in such a way that the communication resource is not allocated to the communication device different from the communication device to which the communication resource is allocated in the preceding allocation state.

Supplementary Note 3

The communication control device according to Supplementary Note 1 or 2, wherein, when changing allocation of the communication resource to each of the communication devices from a preceding allocation state, the intermediate state generation unit generates the intermediate state changed from the preceding allocation state in such a way that the communication resource is allocated to the communication device identical to the communication device to which the communication resource is allocated in the preceding allocation state, or the communication resource is in a state of not being allocated to any of the communication devices.

Supplementary Note 4

The communication control device according to any one of Supplementary Notes 1 to 3, wherein the intermediate state generation unit generates the intermediate state in such a way that the communication resource not allocated to any of the communication devices exists.

Supplementary Note 5

The communication control device according to any one of Supplementary Notes 1 to 4, wherein the intermediate state generation unit generates the intermediate state in such a way that the communication resource not allocated to any of the communication devices exists, and then updates the generated intermediate state in such a way that the communication resource not allocated to any of the communication devices in the generated intermediate state is allocated to any of the communication devices.

Supplementary Note 6

The communication control device according to any one of Supplementary Notes 1 to 5, wherein an allocation value indicating a number of an allocation of the communication resource to the communication device is predetermined, and the intermediate state generation unit generates the intermediate state in such a way that a number of an allocation of the communication resource to the communication device is greater than or equal to the allocation value.

Supplementary Note 7

The communication control device according to any one of Supplementary Notes 1 to 6, wherein the intermediate state generation unit generates the intermediate state, based on reliability information indicating reliability of communication performed by the communication device.

Supplementary Note 7-1

The communication control device according to Supplementary Note 7, wherein the intermediate state generation unit generates the intermediate state, based on a comparison result between the reliability information and a predetermined threshold value.

Supplementary Note 8

The communication control device according to any one of Supplementary Notes 1 to 7, further including a communication monitoring unit monitoring communication performed by the communication device, wherein the intermediate state generation unit generates the intermediate state, based on a monitoring result by the communication monitoring unit.

Supplementary Note 9

A communication control method including:

transmitting, to each of a plurality of communication devices performing communication by use of a previously allocated communication resource, allocation information indicating allocation of the communication resource used by the communication device when performing communication;

when changing allocation of the communication resource to each of the communication devices from a first allocation state to a second allocation state, generating an intermediate state indicating allocation of the communication resource, based on the first allocation state and the second allocation state; and transmitting the allocation information to each of the communication devices in such a way that the first allocation state changes to the second allocation state via an intermediate state generated by the intermediate state generation unit.

Supplementary Note 9-1

The communication control method according to Supplementary Note 9, further including, when changing allocation of the communication resource to each of the communication devices from a preceding allocation state, generating the intermediate state changed from the preceding allocation state in such a way that the communication resource is not allocated to the communication device different from the communication device to which the communication resource is allocated in the preceding allocation state.

Supplementary Note 9-2

The communication control method according to Supplementary Note 9 or 9-1, further including, when changing allocation of the communication resource to each of the communication devices from a preceding allocation state, generating the intermediate state changed from the preceding allocation state in such a way that the communication resource is allocated to the communication device identical to the communication device to which the communication resource is allocated in the preceding allocation state, or the communication resource is in a state of not being allocated to any of the communication devices.

Supplementary Note 10

A program causing a communication control device to provide:

a transmission unit transmitting, to each of a plurality of communication devices performing communication by use of a previously allocated communication resource, allocation information indicating allocation of the communication resource used by the communication device when performing communication; and an intermediate state generation unit generating, when changing allocation of the communication resource to each of the communication devices from a first allocation state to a second allocation state, an intermediate state indicating allocation of the communication resource, based on the first allocation state and the second allocation state, wherein the transmission unit transmits the allocation information to each of the communication devices in such a way that the first allocation state changes to the second allocation state via an intermediate state generated by the intermediate state generation unit.

Supplementary Note 10-1

The program according to Supplementary Note 10, wherein, when changing allocation of the communication resource to each of the communication devices from a preceding allocation state, the intermediate state generation unit generates the intermediate state changed from the preceding allocation state in such a way that the communication resource is not allocated to the communication device different from the communication device to which the communication resource is allocated in the preceding allocation state.

Supplementary Note 10-2

The program according to Supplementary Note 10 or 10-1, wherein, when changing allocation of the communication resource to each of the communication devices from a preceding allocation state, the intermediate state generation unit generates the intermediate state changed from the preceding allocation state in such a way that the communication resource is allocated to the communication device identical to the communication device to which the communication resource is allocated in the preceding allocation state, or the communication resource is in a state of not being allocated to any of the communication devices.

Each of the programs described in the respective aforementioned example embodiments and Supplementary Notes is stored in a storage device or recorded in a computer-readable recording medium. For example, the recording medium is a medium having portability such as a flexible disk, an optical disk, a magneto-optical disk, or a semiconductor memory.

While the present invention has been described above with reference to the respective aforementioned example embodiments, the present invention is not limited to the aforementioned example embodiments. Various changes and modifications that may be understood by a person skilled in the art may be made to the configurations and details of the present invention, within the scope of the present invention.

This application claims priority based on Japanese Patent Application No. 2016-061836 filed on Mar. 25, 2016, the disclosure of which is hereby incorporated by reference thereto in its entirety.

REFERENCE SIGNS LISTS

1 Communication system
2 Communication node
20 Antenna
21 Modulator-demodulator
22 Controlled register
23 Transmission switch
24 Transmission-reception data storage device
3 Allocation control communication node
30 Antenna
31 Modulator-demodulator
32 Controlled register
33 Transmission switch
34 Transmission-reception data storage device
35 Communication monitoring unit
36, 36A, 36B, 36C Communication resource allocation computation processing unit
361A Register
362A Data selection unit
363A AND gate
364A OR gate
365A Update determination unit/OR gate
361B Register
362B Computation device
363B Memory
361C Data division unit
362C Communication resource allocation computation processing unit (36A or 36B)
363C Data integration unit
37 Control application
38 Control memory/step counter
39 Control register
4 Communication control device
41 Transmission unit
42 Intermediate state generation unit

What is claimed is:

1. A communication control device comprising:
a transmission unit transmitting, to each of a plurality of communication devices performing communication by use of a previously allocated communication resource, an allocation information indicating allocation of a communication resource used by each of the plurality of communication devices when performing communication;
an intermediate state generation unit generating, when changing allocation of the communication resource to each of the plurality of communication devices from a first allocation state to a second allocation state, an intermediate state indicating allocation of the communication resource, based on the first allocation state and the second allocation state, and
a communication monitoring unit configured to monitor a first communication performed by a first communication device of the plurality of communication devices,
wherein the transmission unit transmits the allocation information to each of the plurality of communication devices in such a way that the first allocation state changes to the second allocation state via the intermediate state generated by the intermediate state generation unit, so that each resource assignment of the intermediate state is greater than or equal to a lower limit of the communication resource,
wherein the intermediate state is a first intermediate state, and the first intermediate state changes a resource assignment of the first communication device,
wherein the intermediate state generation unit generates a second intermediate state, based on a monitoring result by the communication monitoring unit, and
wherein the monitoring result indicates whether a monitored transmission of the first communication device matches the first intermediate state.

2. A communication control device comprising:
a transmission unit transmitting, to each of a plurality of communication devices performing communication by use of a previously allocated communication resource, an allocation information indicating allocation of a communication resource used by each of the plurality of communication devices when performing communication; and
an intermediate state generation unit generating, when changing allocation of the communication resource to each of the plurality of communication devices from a first allocation state to a second allocation state, an intermediate state indicating allocation of the communication resource, based on the first allocation state and the second allocation state,
wherein the transmission unit transmits the allocation information to each of the plurality of communication devices in such a way that the first allocation state changes to the second allocation state via the intermediate state generated by the intermediate state generation unit, so that each resource assignment of the intermediate state is greater than or equal to a lower limit of the communication resource, and
wherein the generating is implemented with using a bipartite graph in which each of first graph nodes which number is equal to a number of the communication resource is linked to each of second graph nodes which number is equal to a number of the communication devices.

3. The communication control device according to claim 2, wherein,
the generating is implemented through converting the bipartite graph into a first plurality of partial graphs and exchanging the first plurality of partial graphs with a second plurality of partial graphs.

4. The communication control device according to claim 3, wherein,
the converting is implemented so as length of each of the partial graphs is to be near the same value.

* * * * *